(12) United States Patent
Baek et al.

(10) Patent No.: US 11,145,949 B2
(45) Date of Patent: Oct. 12, 2021

(54) ANTENNA APPARATUS AND ELECTRONIC DEVICE COMPRISING SAME

(71) Applicant: Samsung Electronics Co., Ltd., Suwon-si (KR)

(72) Inventors: Kwanghyun Baek, Hwaseong-si (KR); Hyunjin Kim, Seoul (KR); Byungchul Kim, Yongin-si (KR); Jungmin Park, Seoul (KR); Youngju Lee, Seoul (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/319,963

(22) PCT Filed: Aug. 25, 2017

(86) PCT No.: PCT/KR2017/009333
§ 371 (c)(1),
(2) Date: Jan. 23, 2019

(87) PCT Pub. No.: WO2018/043999
PCT Pub. Date: Mar. 8, 2018

(65) Prior Publication Data
US 2019/0252757 A1   Aug. 15, 2019

(30) Foreign Application Priority Data

Aug. 31, 2016 (KR) .......................... 10-2016-0111337

(51) Int. Cl.
*H01Q 1/02* (2006.01)
*H01Q 21/06* (2006.01)
(Continued)

(52) U.S. Cl.
CPC ............... *H01Q 1/02* (2013.01); *H01Q 1/243* (2013.01); *H01Q 9/0457* (2013.01);
(Continued)

(58) Field of Classification Search
CPC ........ H01Q 1/02; H01Q 1/243; H01Q 9/0457; H01Q 21/0025; H01Q 21/064;
(Continued)

(56) References Cited

U.S. PATENT DOCUMENTS 4,032,921 A * 6/1977 Sikina, Jr. ................ H01Q 9/27
343/730
5,914,693 A * 6/1999 Takei ....................... H01Q 13/16
343/767
(Continued)

FOREIGN PATENT DOCUMENTS

CN 102142855 A 8/2011
CN 103700932 A 4/2014
(Continued)

OTHER PUBLICATIONS

European Search Report dated Jun. 17, 2019; European Appln. No. 17846924.3-1205 / 3474380 PCT/KR2017009333.
(Continued)

*Primary Examiner* — Jinsong Hu
*Assistant Examiner* — Rui M Hu
(74) *Attorney, Agent, or Firm* — Jefferson IP Law, LLP

(57) ABSTRACT

The present invention relates to an antenna apparatus and an electronic device comprising the same. The antenna apparatus according to one embodiment of the present invention comprises an array antenna formed on a metal case of an electronic device, wherein the array antenna comprises at least two antenna elements, the at least two antenna elements may operate in the same frequency band. According to one embodiment of the present invention, it is possible to provide an antenna apparatus capable of reducing heat generation and increasing the radiation efficiency of an antenna.

6 Claims, 27 Drawing Sheets

(51) Int. Cl.
  *H04M 1/02* (2006.01)
  *H01Q 9/04* (2006.01)
  *H01Q 1/24* (2006.01)
  *H01Q 21/00* (2006.01)
  *H04B 1/44* (2006.01)
  *H01Q 13/10* (2006.01)

(52) U.S. Cl.
  CPC ........ *H01Q 21/0025* (2013.01); *H01Q 21/064* (2013.01); *H01Q 21/065* (2013.01); *H04B 1/44* (2013.01); *H04M 1/02* (2013.01); *H01Q 13/10* (2013.01)

(58) Field of Classification Search
  CPC ........ H01Q 21/065; H01Q 13/10; H04B 1/44; H04M 1/02
  See application file for complete search history.

(56) References Cited

U.S. PATENT DOCUMENTS

| | | | |
|---|---|---|---|
| 6,252,556 B1 | 6/2001 | Ito et al. | |
| 6,292,140 B1 * | 9/2001 | Osterman | G01J 5/08 343/700 MS |
| 6,326,920 B1 | 12/2001 | Barnett et al. | |
| 6,329,949 B1 | 12/2001 | Barnett et al. | |
| 9,743,554 B2 * | 8/2017 | McLaughlin | G06F 1/20 |
| 10,027,180 B1 * | 7/2018 | Hosseini | H01Q 13/106 |
| 10,256,549 B2 * | 4/2019 | Sharawi | H01Q 1/48 |
| 2002/0122006 A1 * | 9/2002 | Crawford | H01Q 23/00 343/702 |
| 2004/0219956 A1 * | 11/2004 | Iwai | H01Q 5/364 455/575.3 |
| 2006/0038686 A1 * | 2/2006 | Casden | H01Q 9/27 340/572.7 |
| 2006/0066495 A1 * | 3/2006 | Isoifovich | H01Q 13/106 343/770 |
| 2006/0071859 A1 * | 4/2006 | Condon | H01Q 1/48 343/700 MS |
| 2006/0109188 A1 | 5/2006 | Ikeda et al. | |
| 2010/0038426 A1 * | 2/2010 | Casden | G06K 19/0723 235/439 |
| 2011/0188205 A1 | 8/2011 | Macmanus et al. | |
| 2011/0291896 A1 | 12/2011 | Pascolini et al. | |
| 2012/0262347 A1 * | 10/2012 | Tiang | H01Q 1/243 343/702 |
| 2012/0268153 A1 * | 10/2012 | Nickel | G01R 31/3025 324/754.31 |
| 2013/0028180 A1 * | 1/2013 | Gao | H04W 74/0833 370/328 |
| 2013/0207274 A1 * | 8/2013 | Liu | H01L 23/66 257/774 |
| 2013/0222201 A1 * | 8/2013 | Ma | H01Q 1/02 343/834 |
| 2014/0361934 A1 | 12/2014 | Ely et al. | |
| 2015/0311594 A1 * | 10/2015 | Zhu | H01Q 21/28 343/702 |
| 2015/0346322 A1 | 12/2015 | Schmalenberg et al. | |
| 2015/0381229 A1 | 12/2015 | Tzanidis et al. | |
| 2016/0087328 A1 | 3/2016 | Lee et al. | |
| 2016/0164186 A1 * | 6/2016 | Ganchrow | H01Q 13/18 343/702 |
| 2016/0351996 A1 | 12/2016 | Ou | |
| 2017/0110787 A1 * | 4/2017 | Ouyang | H01Q 1/42 |
| 2017/0149119 A1 | 5/2017 | Wang et al. | |
| 2017/0222301 A1 * | 8/2017 | Shiu | H01Q 1/2291 |
| 2017/0309992 A1 * | 10/2017 | Noori | H01Q 1/2258 |
| 2017/0347490 A1 * | 11/2017 | Romig | H05K 13/00 |
| 2018/0198186 A1 * | 7/2018 | Hwang | H04B 5/0075 |
| 2018/0351235 A1 * | 12/2018 | Wang | H01Q 5/378 |
| 2019/0097306 A1 * | 3/2019 | Romano | H01Q 21/064 |
| 2019/0190115 A1 * | 6/2019 | Samardzija | H01Q 9/42 |
| 2019/0288382 A1 * | 9/2019 | Kamgaing | H01Q 21/0025 |

FOREIGN PATENT DOCUMENTS

| | | |
|---|---|---|
| CN | 204231813 U | 3/2015 |
| CN | 105449363 A | 3/2016 |
| CN | 105633596 A | 6/2016 |
| EP | 1 132 997 A1 | 9/2001 |
| JP | 3356866 B2 | 12/2002 |
| JP | 2013-519938 A | 5/2013 |
| KR | 10-1074443 B1 | 10/2011 |
| KR | 10-2013-0040891 A | 4/2013 |
| KR | 10-1606509 B1 | 3/2016 |
| KR | 10-2016-0089333 A | 7/2016 |
| WO | 2016/190999 A1 | 12/2016 |

OTHER PUBLICATIONS

Chinese Office Action with English translation dated Apr. 3, 2020; Chinese Appln No. 201780052023.9.
European Search Report dated May 29, 2020; European Appln. No. 17 846 924.3-1205.

\* cited by examiner (a)

(b)

(c)

ND ELECTRONIC
ANTENNA APPARATUS AND ELECTRONIC DEVICE COMPRISING SAME

TECHNICAL FIELD

The present invention relates to an antenna apparatus and an electronic device including the same, and more particularly, to the antenna apparatus in which an array antenna is formed integrally with a metal case of the electronic device.

BACKGROUND ART

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, the implementation of the 5G communication system in a super-high frequency (mmWave) band (e.g., about a 28 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna.

Meanwhile, in case of using an antenna of the super-high frequency (mmWave) band, an array antenna may be used to increase the overall gain of an antenna apparatus. In addition, an external front end module (FEM) including a power amplifier (PA) may be further used to amplify the power of an antenna. The performance of such an array antenna and external front end module may be directly related to the performance of the entire communication system.

In a transmission mode of the antenna apparatus, a transmission signal is generated in a radio frequency integrated circuit (RFIC) and inputted to the front end module (or the power amplifier). Then the signal is amplified and transmitted to other network entity through the array antenna.

To this end, a first feed line may be connected between the RFIC and the power amplifier, and a second feed line may be connected between the power amplifier and the antenna. However, when the power amplifier is disposed around the array antenna and the RFIC is located under the array antenna, the connection structure of the first and second feed lines may be ineffective.

Also, in case of the super-high frequency band antenna that uses a resonance frequency of 28 GHz, the size of the antenna is very small, about 10 mm, and may cause difficult tuning. Further, at high frequencies, a high insertion loss is caused in a feed line connected between an antenna element and the RFIC, so that S21 is important.

Also, an antenna apparatus to which the multi-input multi-output (MIMO) is applied requires more feed lines connected to the antenna, and this may cause an increase in laminations of a substrate (e.g., PCB). Besides, since there is a correlation between the height of the substrate and the bandwidth of the antenna, an antenna designed in limited substrate laminations may invite the degradation of performance.

DISCLOSURE OF INVENTION

Technical Problem

In order to solve the above-discussed problems, the present invention has an object of providing an antenna apparatus which is capable of reducing the heat generation and increasing the antenna radiation efficiency.

In addition, an object of the present invention is to provide an antenna apparatus capable of improving a transmission insertion loss through an interleaved arrangement with external components.

Also, an object of the present invention is to overcome limitations of antenna radiation by a metal case of an electronic device including an antenna apparatus.

The present invention is not limited to the above objects, and any other object, even though not mentioned herein, may be well understood from the following description by those skilled in the art.

Solution to Problem

In order to accomplish the above objects, an antenna apparatus according to an embodiment of the present invention may comprise an array antenna formed in a metal case of the electronic device, wherein the array antenna may include at least two antenna elements, and wherein the at least two antenna elements may operate in a same frequency band.

In addition, each of the at least two antenna elements may include a radiation part having a shape of a slot passing through the metal case.

In addition, the each of the at least two antenna elements may be a patch antenna having a form of a circle, a square, or a triangle.

In addition, the radiation part may be composed of two semicircular slots facing each other.

In addition, the radiation part may be a circular slot, and an oxide film or a polycarbonate film may be formed on an upper surface of the metal case.

In addition, the antenna apparatus may further comprise a radio frequency (RF) module disposed under the metal case; and a metal case connection member connecting the RF module and the metal case and dissipating heat of the antenna element.

In addition, the antenna apparatus may further comprise at least one power amplifier formed around the array antenna on an upper surface of the RF module.

In addition, the antenna apparatus may further comprise at least one power amplifier disposed between the upper surface of the RF module and a lower surface of the array antenna.

In addition, the RF module may further include a feed line located therein, and the feed line may be connected to the array antenna by aperture feeding and may supply a signal to the antenna element through coupling.

In addition, the RF module may include an upper feed line located on an upper surface thereof; and a feed line located therein and connected directly to the upper feed line.

In addition, the RF module may include at least one heat dissipation via formed therein.

Also, in order to accomplish the above objects, an electronic device according to an embodiment of the present invention may comprise a metal case; and an array antenna formed in the metal case, wherein the array antenna may include at least two antenna elements, and wherein the at least two antenna elements may operate in a same frequency band.

Advantageous Effects of Invention

According to an embodiment of the present invention, it is possible to provide an antenna apparatus capable of reducing the heat generation and increasing the antenna radiation efficiency.

Also, the present invention can provide an antenna apparatus capable of improving a transmission insertion loss through an interleaved arrangement with external components.

Further, the present invention can overcome limitations of antenna radiation limit by a metal case of an electronic device including an antenna apparatus.

Effects obtained by the present invention are not limited to the above-mentioned effects, and other effects, even though not mentioned herein, may be well understood from the following description by those skilled in the art.

MODE FOR THE INVENTION

Figure 1:
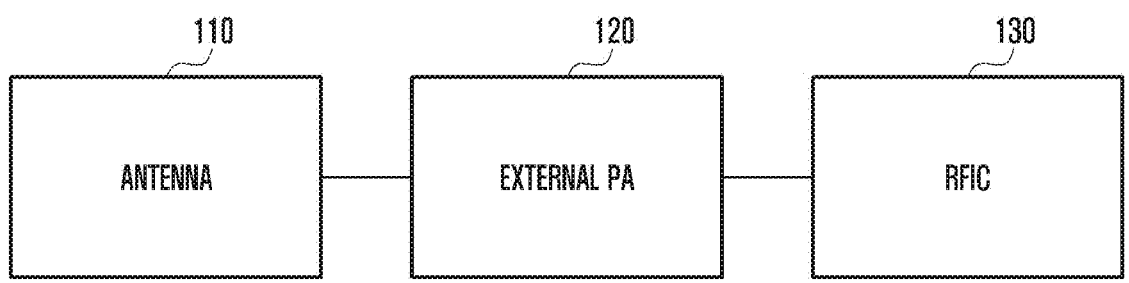
FIG. 1 is a block diagram illustrating an antenna apparatus according to an embodiment of the present invention.

Now, embodiments of the present invention will be described in detail with reference to the accompanying drawings. In the following description of embodiments, descriptions of techniques that are well known in the art and not directly related to the present invention are omitted. This is to clearly convey the subject matter of the invention by omitting any unnecessary explanation.

When it is stated that a certain element is "coupled to" or "connected to" another element, the element may be directly coupled or connected to another element, or a new element may exist between both elements. Also, the terms "include", "comprise", and "have" as well as derivatives thereof, mean inclusion without limitation.

In embodiments of the present invention, elements are shown independently to indicate different characteristic functions, but this does not mean that each element is formed of separate hardware or one software unit. That is, respective individual elements are merely for convenience of explanation, and at least two elements may form one element, or one element may be divided into a plurality of elements to perform a function. In any case, related embodiments are also included within the scope of the present invention.

In addition, some elements are not always essential to perform essential functions in the present invention, and may be optional elements only to improve performance. Therefore, the present invention may be implemented only with elements essential for realizing the subject matter of the present invention except for the components used for performance enhancement, and can be implemented with only the essential elements except for optional elements used for performance improvement.

The terms used herein should not be construed as limited to ordinary or dictionary definition terms, but should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a block diagram illustrating an antenna apparatus according to an embodiment of the present invention.

Referring to FIG. 1, the antenna apparatus according to an embodiment of the present invention may include an antenna 110, an external front end module (FEM) 120, and a radio frequency integrated circuit (RFIC) 130.

The antenna 110 may be an array antenna including at least two antenna elements and may operate at a predetermined resonance frequency. For example, the array antenna 110 may include sixteen antenna elements, which may be classified into eight transmission antenna elements and eight reception antenna elements when there is no separate RF switch.

The external front end module 120 may include a power amplifier (PA), a low noise amplifier (LNA), a switch, and the like. The front end module 120 may amplify the power of the antenna 110, reduce noise, and perform switching of transmission/reception (Tx/Rx) modes. The external front end module 120 may be located outside the antenna 110 so as to increase a communication distance of the antenna apparatus. Since the power amplifier performs a power amplification function the external front end module 120, the external front end module and the external power amplifier will be used interchangeably hereinafter.

In case of the transmission mode of the antenna apparatus, for example, a transmission signal may be generated in the RFIC 130, inputted to the front end module (or the power amplifier) 120, amplified in the front end module 120, and transmitted to other network entity through the antenna 110.

Meanwhile, a connection loss may occur depending on the length of a feed line (not shown) connecting the RFIC 130 and the antenna 110. For example, in the antenna apparatus that operates at a resonance frequency of 30 GHz, the connection loss of about 0.25 dB per about 1 mm of the feed line length may occur. Therefore, as the length of the feed line between the RFIC 130 and the antenna 110 increases, the connection loss also increases. This adversely affects the overall communication performance. Further, since the efficiency of the currently commercialized power amplifier (PA) is low, about 85 to 95% of power consumption may be used to generate heat in case of the connection loss of 4 dB or more.

Accordingly, there is a need to provide the antenna apparatus capable of reducing the connection loss and having an efficient structure for reduction in heat dissipation.

Figure 2:
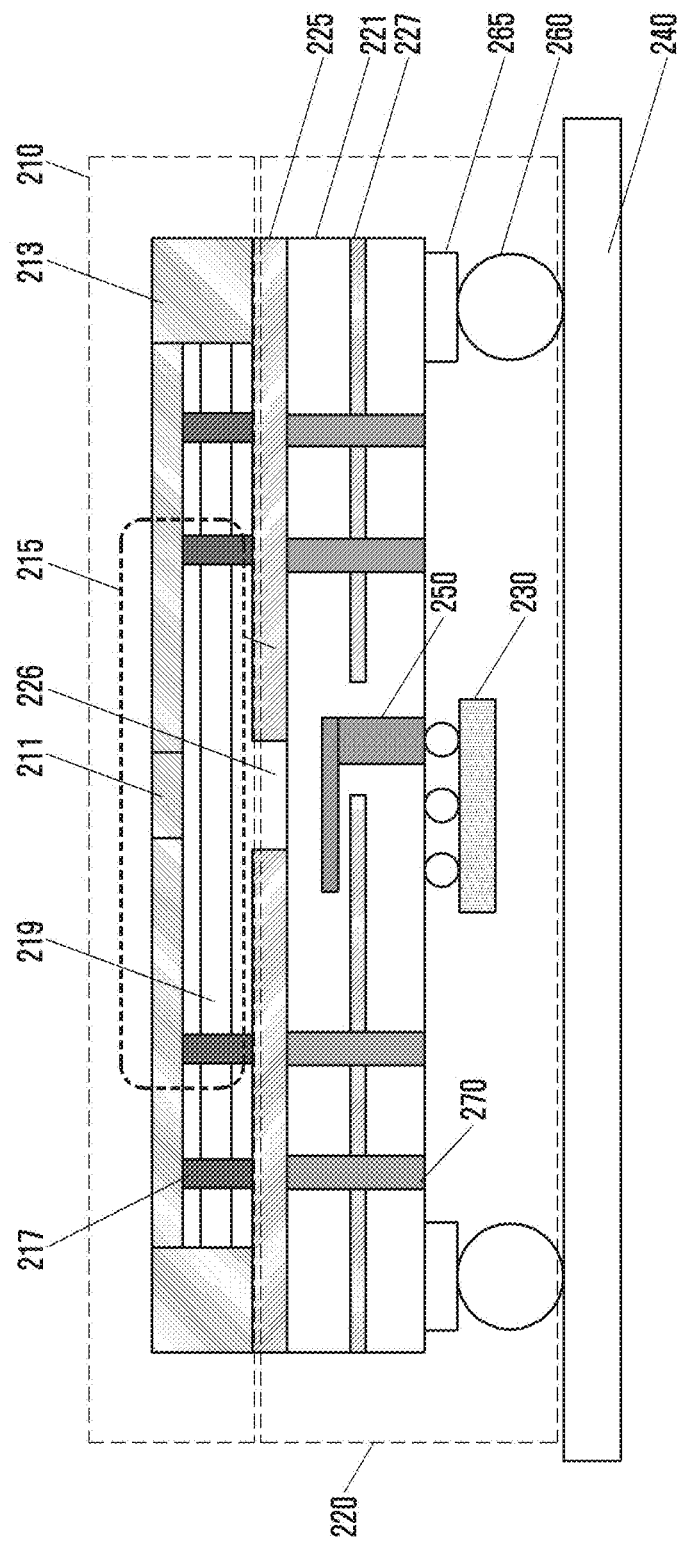
FIG. 2 is a cross-sectional view illustrating an antenna apparatus and an electronic device including the antenna apparatus according to an embodiment of the present invention.
Figure 3:
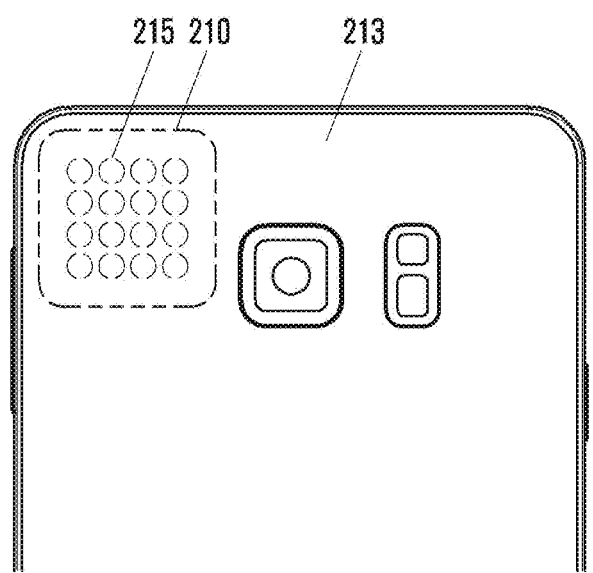
FIG. 3 is a diagram illustrating a rear face of an electronic device having an array antenna according to an embodiment of the present invention.

FIG. 2 is a cross-sectional view illustrating an antenna apparatus and an electronic device including the antenna apparatus according to an embodiment of the present invention. FIG. 3 is a diagram illustrating a rear face of an electronic device having an array antenna according to an embodiment of the present invention.

Referring to FIGS. 2 and 3, the electronic device according to an embodiment of the present invention may include an array antenna 210, a radio frequency (RF) module 220, and a main substrate 240. The electronic device may be user equipment (UE). For example, the electronic device may communicate with other network entity such as a mobile phone, a smart phone, a PDA, a notebook, or the like.

The array antenna 210 may be formed in a metal case 213 of the electronic device and may include at least two antenna elements 215. The at least two antenna elements 215 may operate in the same frequency band. In some embodiments, the array antenna 210 may be formed in a portion of the rear surface of the metal case 213 of the electronic device. Although only one antenna element 215 is shown in FIG. 2, this is merely for convenience of illustration, and a plurality of antenna elements 215 may be formed on the rear surface of the metal case 213. The metal case 213 may be made of a conductive material and a heat transferable material. For example, the metal case 213 may be made of a metal including aluminum.

In addition, each antenna element 215 may include a radiation part 211 for radiating an antenna signal to the outside of the electronic device. The radiation part 211 may be formed on the rear surface of the metal case 213 so that a signal radiated from the antenna element 215 may be radiated to the outside of the electronic device. The radiation part 211 may have a shape of a slot passing through the metal case 213 or may have a circular shape, a square shape, a triangle shape, or the like.

As shown in FIG. 3, the array antenna 210 may be formed on the rear surface of the metal case 213 and may include a plurality of antenna elements 215. In an embodiment, the array antenna 210 may include sixteen antenna elements 215 arranged in four rows and four columns. The antenna element 215 may be formed like a patch having a slot 211 passing through the metal case 213. Depending on embodiments, each antenna element 215 may be circular, square or rectangular in shape. When the radiation part 211 has the circular slot shape, the radiation part 211 may be formed of two semicircular slots facing each other. This can realize an integrated array antenna structure in which the antenna elements 215 are integrated with and not separated from the metal case 213. Also, while including the radiation part 211 of two semicircular slots facing each other, the antenna element 215 may be formed of a stack couple patch in the shape of a circle, a square, or a triangle, and may be, in part, shorted with the metal case 213 or open.

Meanwhile, when the antenna is located inside the metal case 213, a signal may not pass through the metal case 213. Therefore, in order for the antenna to emit or receive a signal, the metal case 213 should have an open portion. In contrast, when the array antenna 210 is integrally formed on the rear surface of the metal case 213 of the electronic device as in the present invention, the array antenna 210 is capable of transmitting and receiving signals even though the metal case 213 does not have any separate opening.

In addition, because the array antenna 210 is integrally formed on the rear surface of the metal case 213, heat generated at the array antenna 210 may be dissipated directly to the outside of the metal case 213.

The metal case 213 may include at least one metal case connection member 217 that combines the metal case 213 and the RF module 230. The metal case connection member 217 may be a screw, a pin, or any other type of a connection bridge.

The metal case connection member 217 may be made of a thermally conductive material capable of conducting heat. The heat generated at the array antenna 210 may be transmitted to the RF module 220 through the metal case connection member 217. Then, the heat transmitted to the RF module 220 may be dissipated to the outside of the electronic device through a heat dissipation via 270 and a heat dissipation part (not shown) which will be described later. Therefore, the metal case connection member 217 may perform a function of dissipating heat and thus may be referred to as an array antenna heat dissipation member.

In addition, there may be a cavity between the metal case 213 and the RF module 220. Therefore, the heat generated at the array antenna 210 may be dissipated through the cavity, and this may produce a heat reduction effect.

As described above, because the array antenna 210 is formed integrally with the metal case 213 of the electronic device, the heat generated at the array antenna 210 may be directly dissipated to the outside of the electronic device through the metal case 213 and also dissipated to the outside of the electronic device through the heat dissipate part (not shown) through the metal case connection member 217. That is, in a case where the array antenna 210 is formed integrally with the metal case 213 of the electronic device according to an embodiment of the present invention, the heat generated at the array antenna 210 is removed in both directions. Therefore, this may produce an excellent heat reduction effect.

In a certain embodiment, the metal case 213 may further include an inner case 219 therein. The inner case 219 may be made of plastic, metal, or the like to protect internal components of the electronic device.

The RF module 220 performs radio communication with other electronic device by performing operations of transmitting/receiving a radio frequency signal and also performing operations of amplifying and converting the signal. The RF module 220 may include processors (not shown) that control the above operations. The RF module 220 may be supplied with power by an external power supplier (not shown). In addition, the RF module 220 may include an RF module substrate 221, which may be a printed circuit board (PCB). The RF module substrate 221 may have a plurality of ground layers 227 formed therein. Also, an upper layer 225 may be formed on the upper surface of the RF module substrate 221 while being in contact with the metal case 213 of the electronic device. The upper layer 225 may be formed of an insulating material to insulate the RF module 220 from the metal case 213. The array antenna 210 may be mounted on the RF module substrate 221 of the RF module 220 by using a surface mounting technology (SMT), a screw, a pogo pin block, or the like.

In the RF module substrate 221 of the RF module 220, a plurality of heat dissipation vias 270 may be formed. The heat dissipation via 270 may perform a function of dissipating heat generated at the RF module 220 and heat generated at the array antenna 210 located above the RF module 220. In a certain embodiment, the heat dissipation vias 270 may be formed vertically between the upper and lower surfaces of the RF module substrate 221. The heat generated at the RF module 220 or the array antenna 210 located above the RF module 220 may be transmitted to the lower surface of the RF module 220 through the heat dissipation vias 270. Then, the heat transmitted to the lower surface of the RF module 220 may be dissipated through a heat dissipation part (not shown) located below the RF module 220. The heat dissipation part (not shown) may be a thermal interface material (TIM). Therefore, it is possible to reduce the performance degradation (e.g., gain reduction, speed lowering, etc.) caused by heat generation of the array antenna 210 and the RF module 220.

On the lower surface of the RF module substrate 221 of the RF module 220, an RFIC 230 for supplying power to the array antenna 210 may be included. The RFIC 230 may supply power to the array antenna 210 through a feed line 250 formed in the RF module substrate 221.

In an embodiment, the connection between the feed line 250 and the array antenna 210 may be implemented by aperture feeding as shown in FIG. 2. That is, the RFIC 230 may supply power to the feed line 250, and the power supplied to the feed line 250 may be supplied to the antenna element 215 included in the array antenna 210 through coupling between the feed line 250 and the antenna element 215. For such coupling, the upper layer 225 may have an upper opening 226 formed at a location corresponding to the antenna element 215 as shown. If there is no upper opening, a signal supplied to the feed line 250 may not pass through the insulating upper layer 225 formed on the upper surface of the RF module substrate 221, and thus the coupling with the antenna element 215 may not occur. When the upper opening 226 is formed in the upper layer 225, the signal supplied to the feed line 250 may be transmitted to the antenna element 215 through the upper opening 226.

In another embodiment, an upper feed line may be formed on the upper surface of the RF module substrate 221 and directly connected to the feed line 250 (i.e., direct feeding). In this case, coupling occurs between the upper feed line and the antenna element 215 of the array antenna 210, so that a signal may be supplied to the antenna element 215. Details of this will be described later.

Meanwhile, the main substrate 240 may control the overall operations of the electronic device. Although not shown, processors may be located on the main board 240 to control such operations. An external power supplier (not shown) may supply power to the main substrate 240. The main substrate 240 may be a PCB.

In addition, a main substrate connection member 260 may be formed between the main substrate 240 and the RF module 220 so as to connect the main substrate 240 and the RF module 220. In a certain embodiment, an adhering member 265 may be formed between the main substrate connection member 260 and the RF module 220. For example, the main substrate connection member 260 may be a ball grid array (BGA). Alternatively, the main substrate connection member 260 may be a conductive film or tape or any other equivalent. In a certain embodiment, all of the RFIC 230 and the antenna 210 may be integrated into the main substrate 240.

Figure 4:
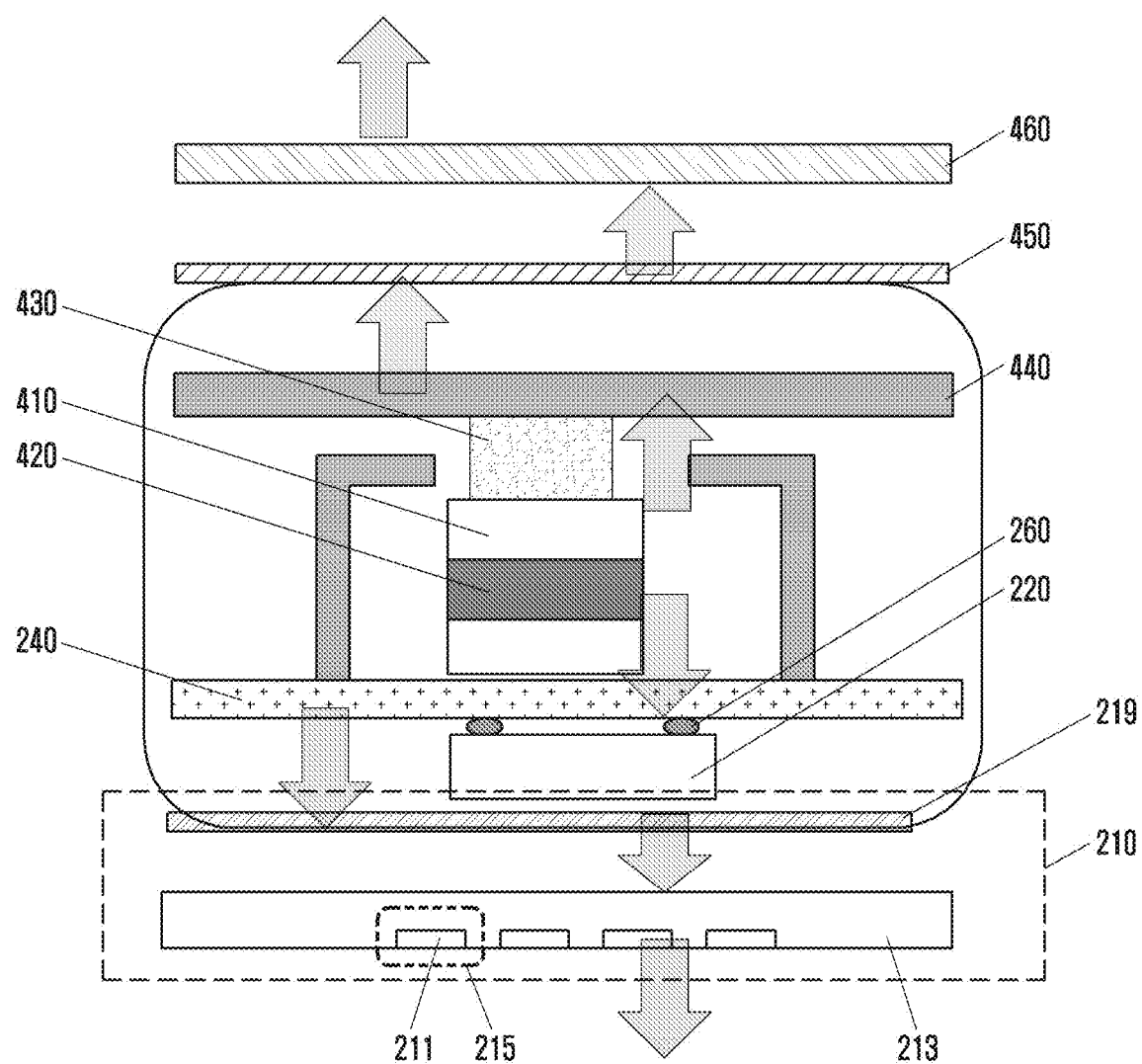
FIG. 4 is a schematic diagram illustrating a heat dissipation process of an electronic device according to an embodiment of the present invention.

FIG. 4 is a schematic diagram illustrating a heat dissipation process of an electronic device according to an embodiment of the present invention.

Referring to FIG. 4, the electronic device according to an embodiment of the present invention may include the array antenna 210 integrally formed on the rear surface of the metal case 213. The array antenna 210 may include at least two antenna elements 215, which may operate in the same frequency band. In addition, the antenna element 215 may have the radiation part 211 for radiating an antenna signal to the outside of the electronic device. Also, the inner case 219 may be included in the metal case 213.

The array antenna 210 may be connected to the RF module 220 including the RFIC 230, and the RF module 220 may be connected to the main substrate 240. A control unit 410 of the electronic device may be disposed on a surface of the main substrate 240 opposite to a surface where the RF module 220 is mounted. The control unit 410 may include at least one processor 420 for controlling the electronic device, and the processor 420 may be a die, for example. In a certain embodiment, the control unit 410 may be connected to a heat dissipation part 430 for dissipating heat generated in the electronic device. The heat dissipation part 430 may be, for example, a TIM.

In an embodiment, a support member 440 may be connected to the control unit 410 in a direction opposite to the direction of the main substrate 240 so as to support the control unit 410 and the main substrate 240.

In addition, a heat dissipation sheet 450 and a display unit 460 may be disposed toward the front side of the electronic device. The display unit 460 may be a panel in which plenty of pixels are arranged in a matrix form. For example, the display unit 460 may be a liquid crystal display (LDC), an organic light emitting diode (OLED), a passive matrix OLED (PMOLED), an active matrix OLED (AMOLED), or the like.

Referring to FIGS. 3 and 4, heat generated at the control unit 410 may be transmitted in the form of a thermal conduction both in a direction of the heat dissipation part 430 and in a direction of the main substrate 240. The heat transmitted to the heat dissipation part 430 is delivered to the heat dissipation sheet 450 in the form of a thermal conduction or radiation through the support member 440 and again delivered to the display unit 460 in the form of a thermal conduction or radiation. Then, the display unit 460 may dissipate the heat to the outside of the electronic device in the form of a thermal convection or radiation. On the other hand, the heat transmitted to the main substrate 240 from the control unit 410 may be delivered to the RF module 220 in the form of a thermal conduction or radiation through the heat dissipation vias 270. Then, the RF module 220 may deliver the heat to the metal case 213 in the form of a thermal conduction or radiation through the metal case connection member 217, and finally this heat may be dissipated to the outside of the electronic device in the form of a thermal convection or radiation.

Heat generated at the array antenna 210 may be directly dissipated to the outside of the metal case 213 in the form of a thermal convection or radiation. In addition, the heat generated at the array antenna 210 may be transmitted sequentially to the RF module 220, the main substrate 240, and the heat dissipation part 430 in the form of a thermal conduction or radiation. Then, the heat may be delivered to the display unit 460 through the dissipation sheet 450 in the form of a thermal conduction or radiation and finally dissipated to the outside of the electronic device in the form of a thermal convection or radiation.

As such, the heat generated at the array antenna 210 may be dissipated to the outside of the electronic device directly through the metal case 213 and also dissipated through the metal case connection member 217 and the heat dissipation part 430 inside the electronic device.

Figure 5:
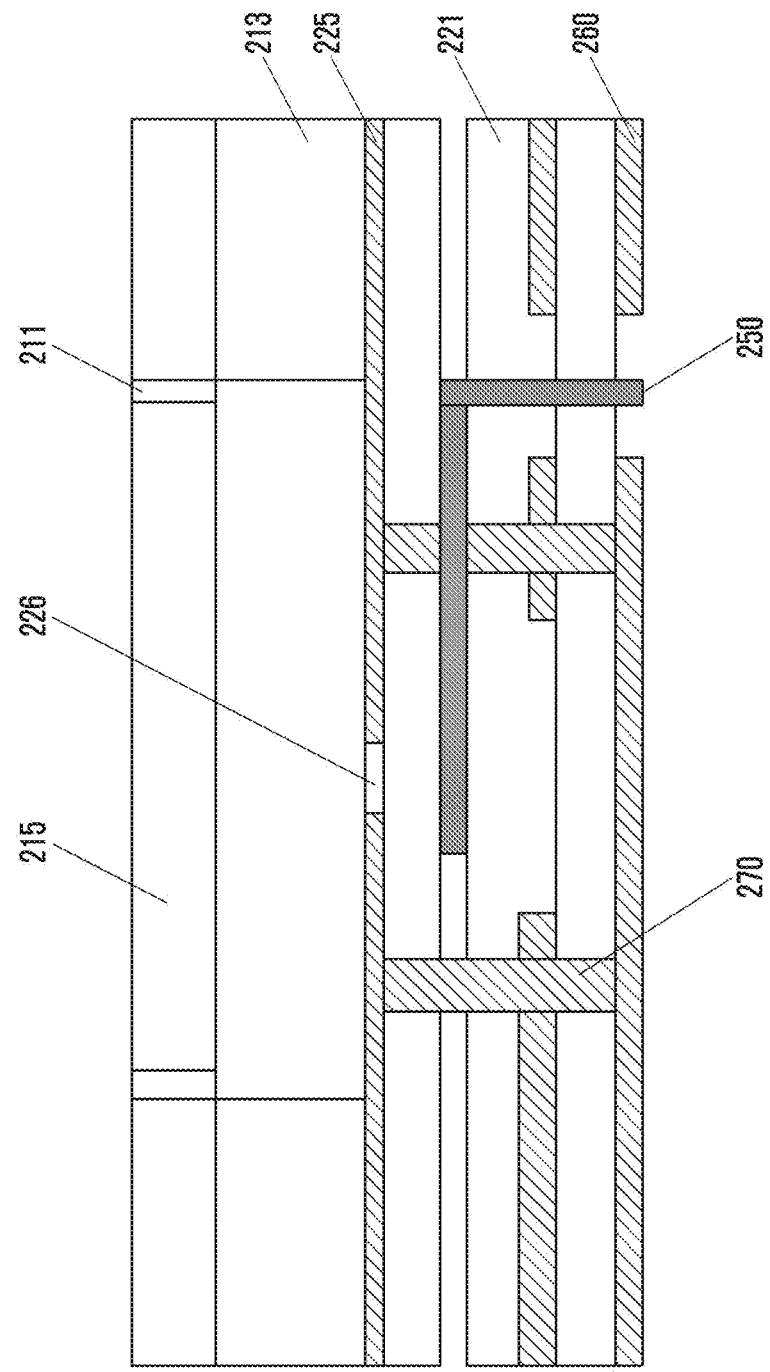
FIG. 5 is a cross-sectional view illustrating an antenna element and an RF module combined with each other according to an embodiment of the present invention.
Figure 6:
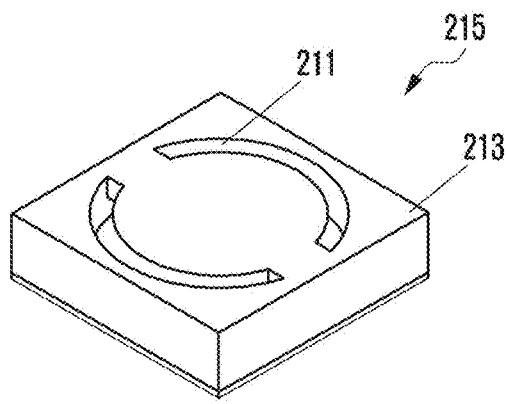
FIG. 6 is a perspective view illustrating an antenna element and an RF module according to an embodiment of the present invention.
Figure 6:
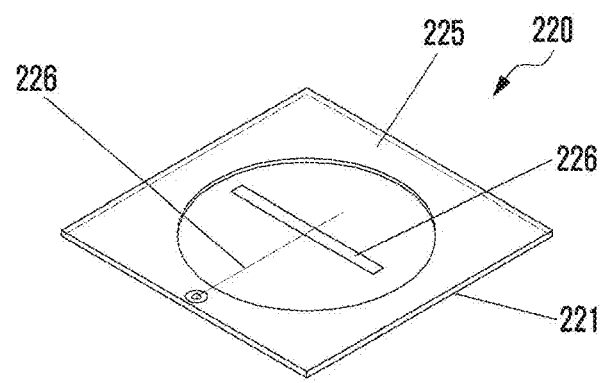
Figure 6:
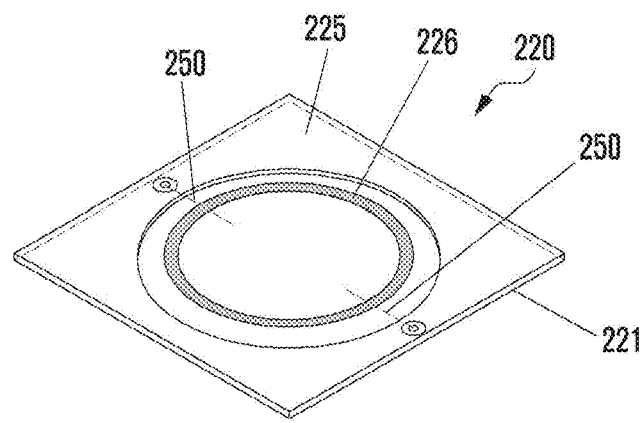
Figure 7:
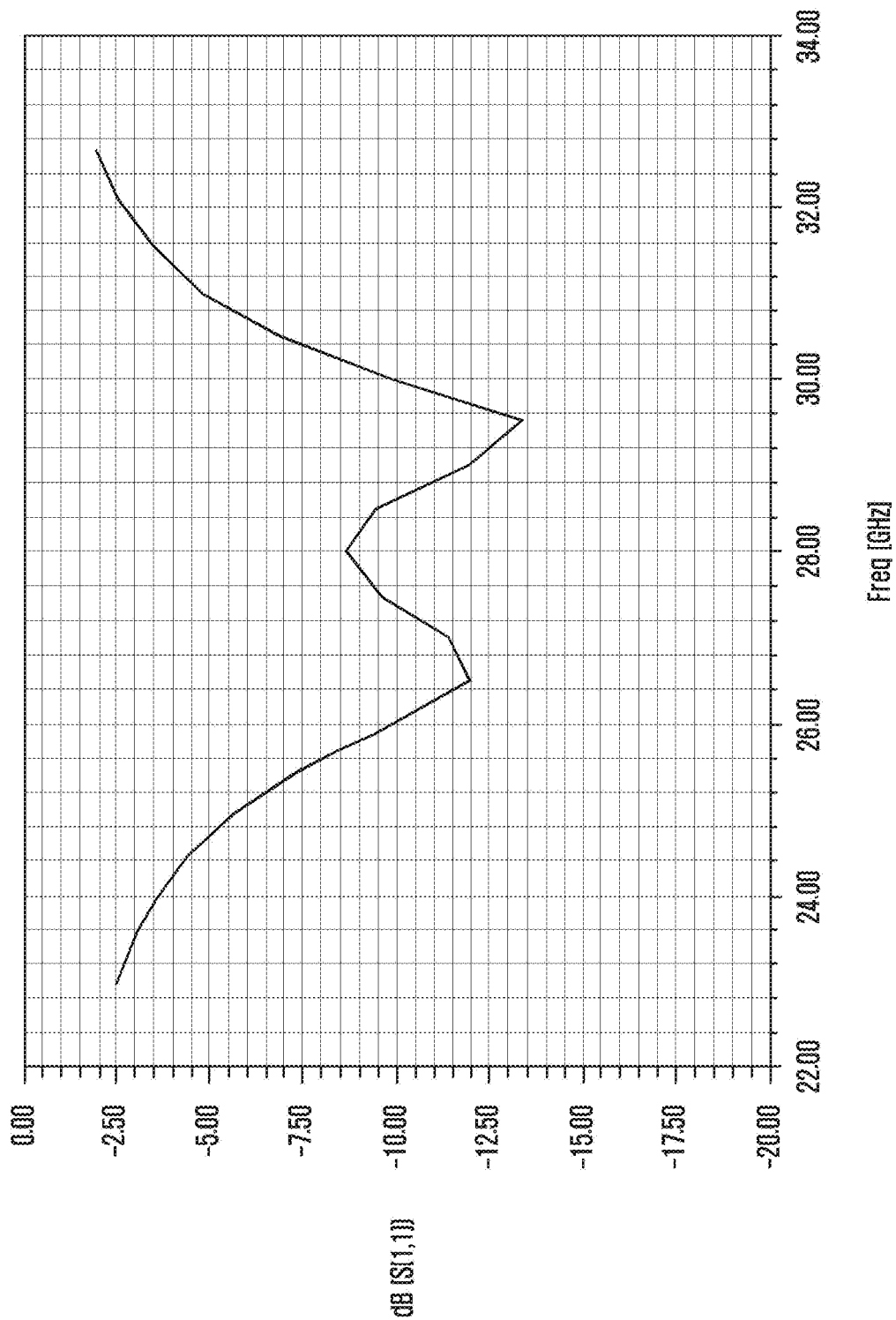
FIG. 7 is an S11 graph showing an antenna frequency band performance of an antenna apparatus according to an embodiment of the present invention.
Figure 8:
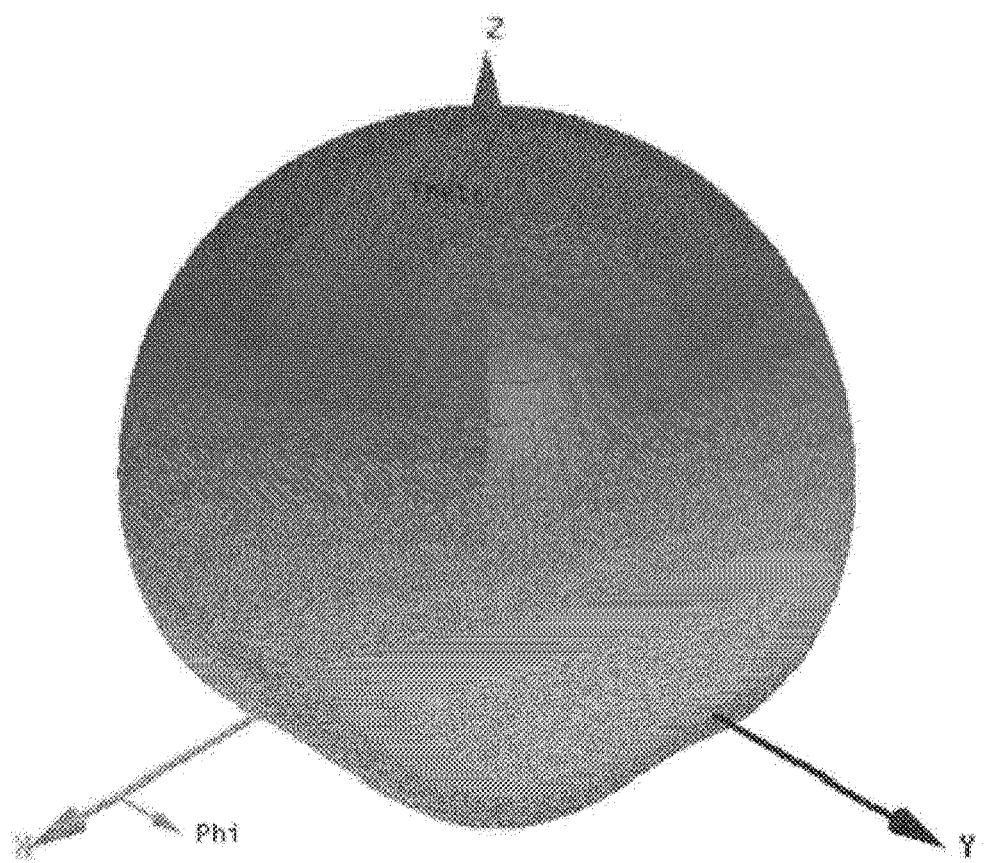
FIG. 8 is a diagram illustrating a radiation pattern of an antenna apparatus according to an embodiment of the present invention.

FIG. 5 is a cross-sectional view illustrating an antenna element and an RF module combined with each other according to an embodiment of the present invention. FIG. 6 is a perspective view illustrating an antenna element and an RF module according to an embodiment of the present invention. FIG. 7 is an S11 graph showing an antenna frequency band performance of an antenna apparatus according to an embodiment of the present invention. FIG. 8 is a diagram illustrating a radiation pattern of an antenna apparatus according to an embodiment of the present invention.

Referring to FIG. 5 and (a) of FIG. 6, in the electronic device according to an embodiment of the present invention, the array antenna 210 including the antenna elements 215 may be formed in the metal case 213 of the electronic device. The antenna element 215 may include the radiation part 211, which may have a shape of a slot passing through the metal case 213. In a certain embodiment, each antenna element 215 may include the radiation part 211 formed of two semicircular slots 211 facing each other.

In addition, the RF module 210 may be combined with the metal case 213. As described above with reference to FIGS. 2 to 4, the RF module 210 may include the feed line 250 formed in the RF module substrate 221 to supply power to the array antenna 210. Also, the heat dissipation vias 270 may be further included to dissipate heat generated at the RF module 220.

In addition, the upper layer 225 may be formed on the upper surface of the RF module substrate 221, and the upper layer 225 may have the upper opening 226 at a location corresponding to the antenna element 215. The upper opening 226 may have a straight line shape as shown in (b) of FIG. 6 or may have the same circular shape as the antenna element 215 as shown in (c) of FIG. 6.

In addition, as shown in FIG. 5, the feed line 250 may be connected to the antenna element 215 by aperture feeding. Specifically, the feed line 250 may be extended from the lower surface of the RF module substrate 221 to an intermediate layer of the RF module substrate 221. For example, when the RF module substrate 221 is composed of four layers, the feed line 250 may be extended from the fourth layer to an upper face of the second layer vertically in the RF module substrate 221. Also, the feed line 250 may be extended toward the upper opening 226 horizontally between the first and second layers. Because the upper opening 226 is formed at a location corresponding to the antenna element 215 in the upper layer 225, a signal supplied to the feed line 250 may be transmitted to the antenna element 215 included in the array antenna 210 through coupling between the feed line 250 and the antenna element 215.

As such, a combination structure of the antenna element 215 and the RF module 220 according to an embodiment of the present invention may be a structure in which an IC, a substrate (e.g., a PCB), and a metal cavity are combined. In addition, by connecting the feed line 250 and the antenna element 215 through an aperture coupling feeding scheme, the RF module 210 may realize required impedance through the minimum number of layers.

Shown in FIG. 7 is an S11 graph that indicates the antenna frequency band performance in the antenna structure in which the antenna element 215 is combined with the metal case 213. As shown in this graph, a frequency of −10 dB or less represented by S11 may be about 26 to 30 GHz, and a bandwidth thereof may be about 4 GHz. Therefore, compared to the bandwidth of 0.8 GHz of a typical patch antenna, a bandwidth improvement effect of about 3 GHz can be obtained.

Also, shown in FIG. 8 is a radiation pattern of the antenna apparatus according to an embodiment of the present invention. At a frequency of 28 GHz, the frequency gain may be about 6.03 dBi, and the directivity may be about 7.43 dBi. Thus, the efficiency is about 72.4%. Accordingly, compared to a typical patch antenna having the gain of 4.46 dBi, the directivity of 6.99 dBi, and the efficiency of 59.8%, the gain and efficiency can be increased.

Figure 9:
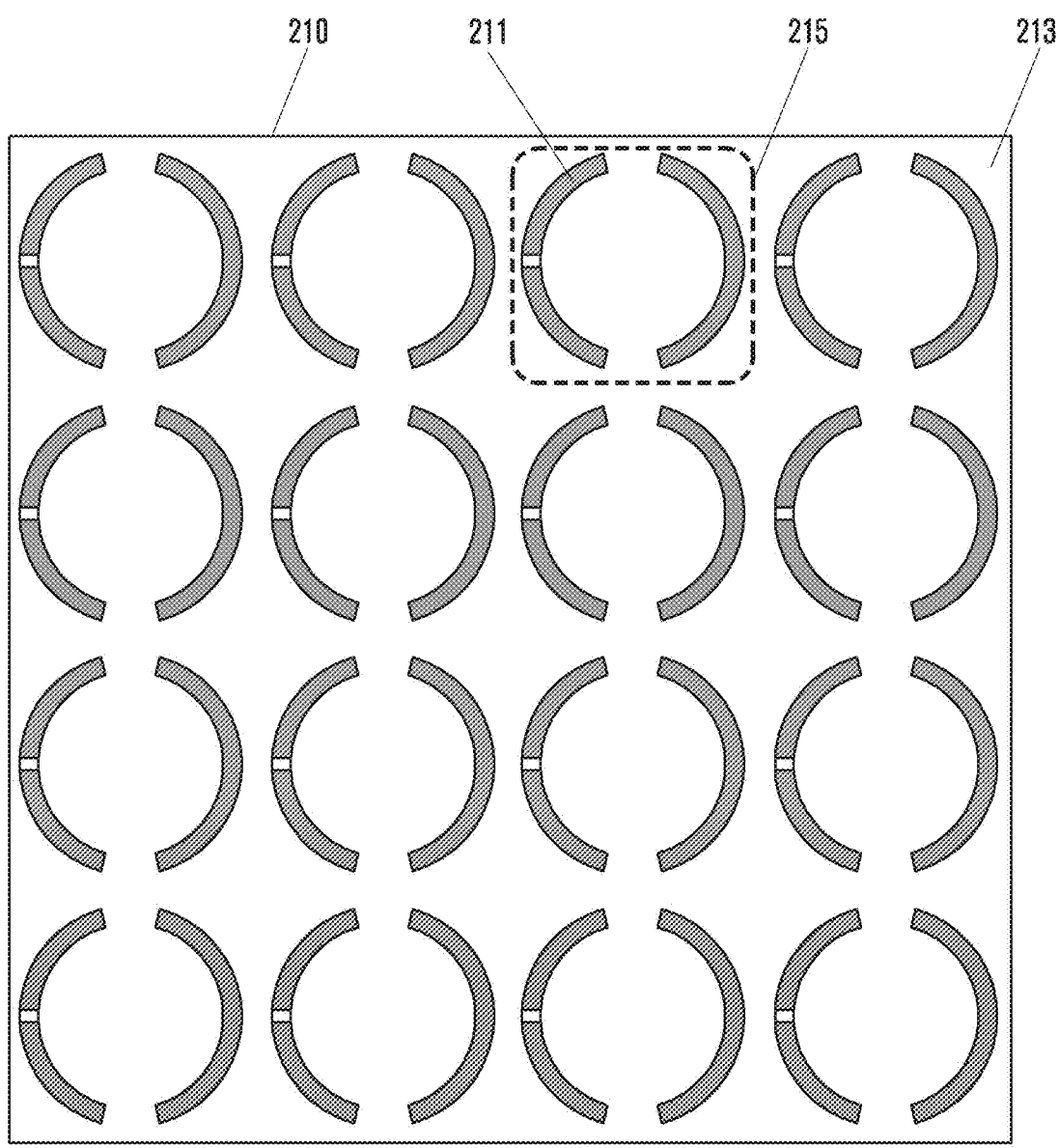
FIG. 9 is a diagram illustrating an example of an array antenna according to an embodiment of the present invention.
Figure 10:
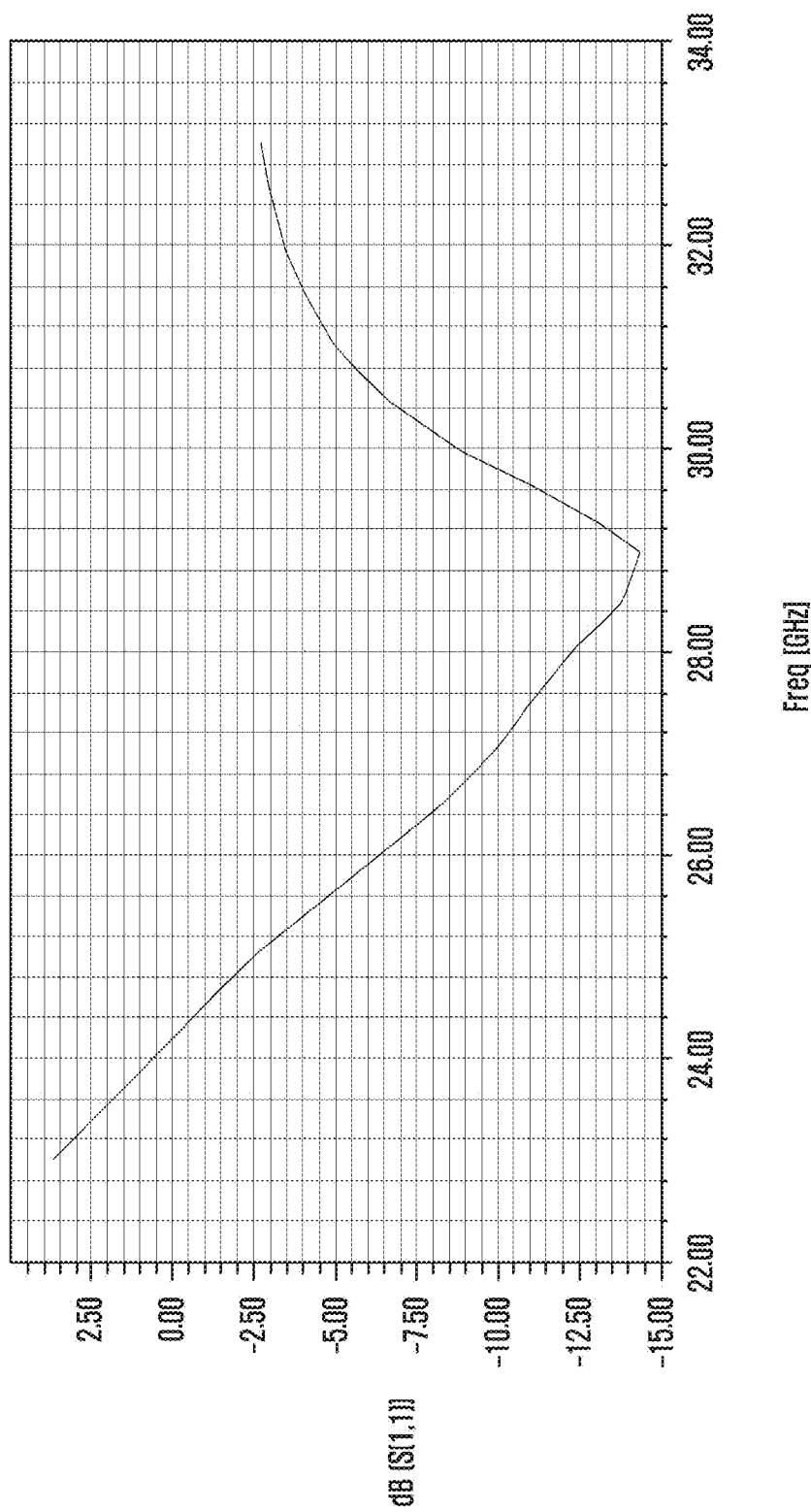
FIG. 10 is an S11 graph showing an antenna frequency band performance of an array antenna according to an embodiment of the present invention.
Figure 11A:
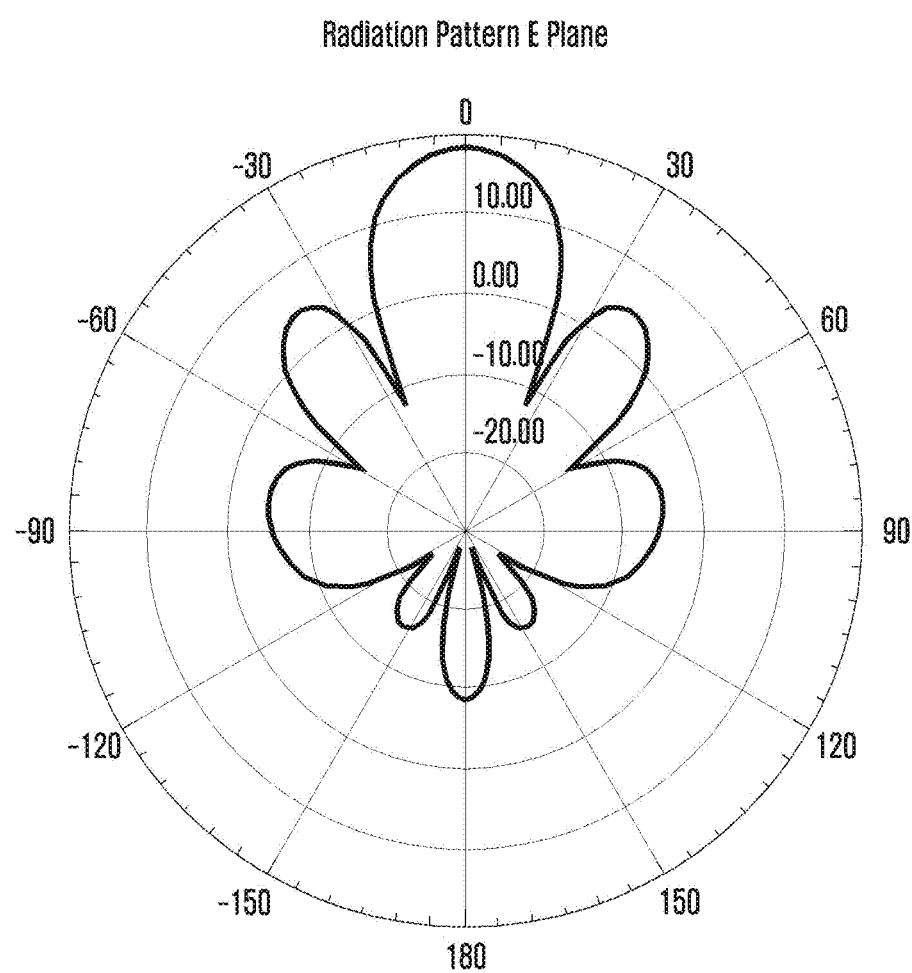
FIGS. 11A and 11B are diagrams illustrating a radiation pattern of an array antenna according to an embodiment of the present invention.
Figure 11B:
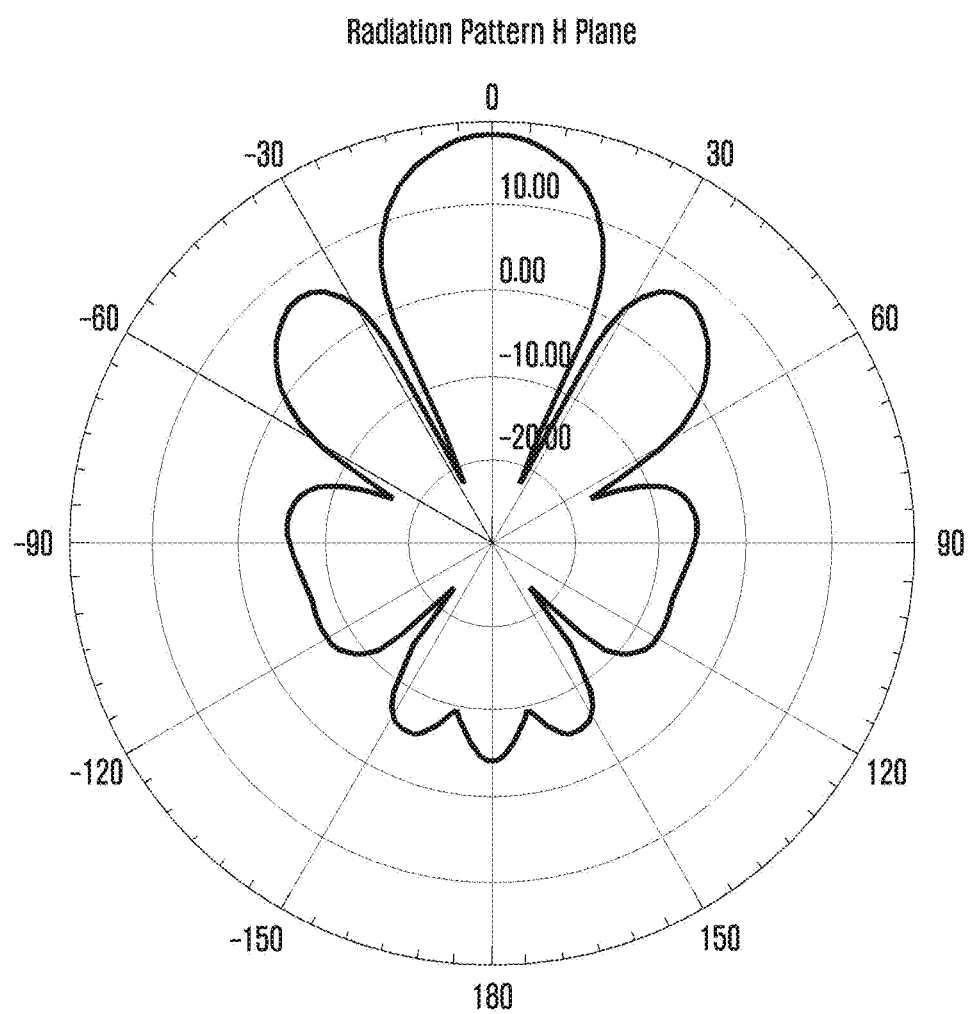

FIG. 9 is a diagram illustrating an example of an array antenna according to an embodiment of the present invention. FIG. 10 is an S11 graph showing an antenna frequency band performance of an array antenna according to an embodiment of the present invention. FIGS. 11A and 11B are diagrams illustrating a radiation pattern of an array antenna according to an embodiment of the present invention.

Referring to FIG. 9, the array antenna 210 according to an embodiment of the present invention may include at least two antenna elements 215. In addition, the antenna elements 215 may be formed in the metal case 213 of the electronic device.

In a certain embodiment, the array antenna 210 may include sixteen antenna elements 215 arranged in four rows and four columns as shown in FIG. 9. Also, as described above with reference to FIGS. 2 to 8, each of the antenna elements 215 may have the radiation part 211 shaped like a slot passing through the metal case 213. In this case, among sixteen antenna elements 215, eight may be transmission antenna elements, and the others may operate as reception antenna elements.

The slot-shaped radiation part 211 may be composed of two semicircular slots facing each other. This allows the antenna element 215 to be integrally combined with the metal case 213.

Meanwhile, although not shown, the antenna element 215 may have a shape other than a circular patch shape. For example, the antenna element 215 may have an elliptical, square, rectangular, or triangular patch shape. Also, the radiation part 211 of the antenna element 215 may be an elliptical, square, rectangular, or triangular shaped slot.

In addition, the array antenna 210 may be designed using a metal processing technique. For example, using a CNC machining technique, the antenna elements 215 of the array antenna 210 may be formed in the metal case 213. Alternatively, the array antenna 210 may be formed by processing the metal case 213 through a 3D printing technique. Alternatively, the array antenna 210 may be fabricated by processing the metal case 213 through a 2nd PCB (high end or general FR4) technique.

In case of the array antenna including the patch-shaped antenna elements 215 having the radiation part of the circular slot 211, a frequency of −10 dB or less is about 27.3 to 29.5 GHz as shown in FIG. 10, so that a bandwidth may be about 2.2 GHz. Also, referring to FIGS. 11A and 11B in which radiation patterns at 28 GHz are shown, the gain is about 17.85 dBi, and the directivity is 18.3 dBi. Thus, the efficiency is about 90%. Accordingly, compared to the performance of a typical patch antenna, the gain is improved by about 2 dB, and the bandwidth is improved by about 1 GHz.

Figure 12:
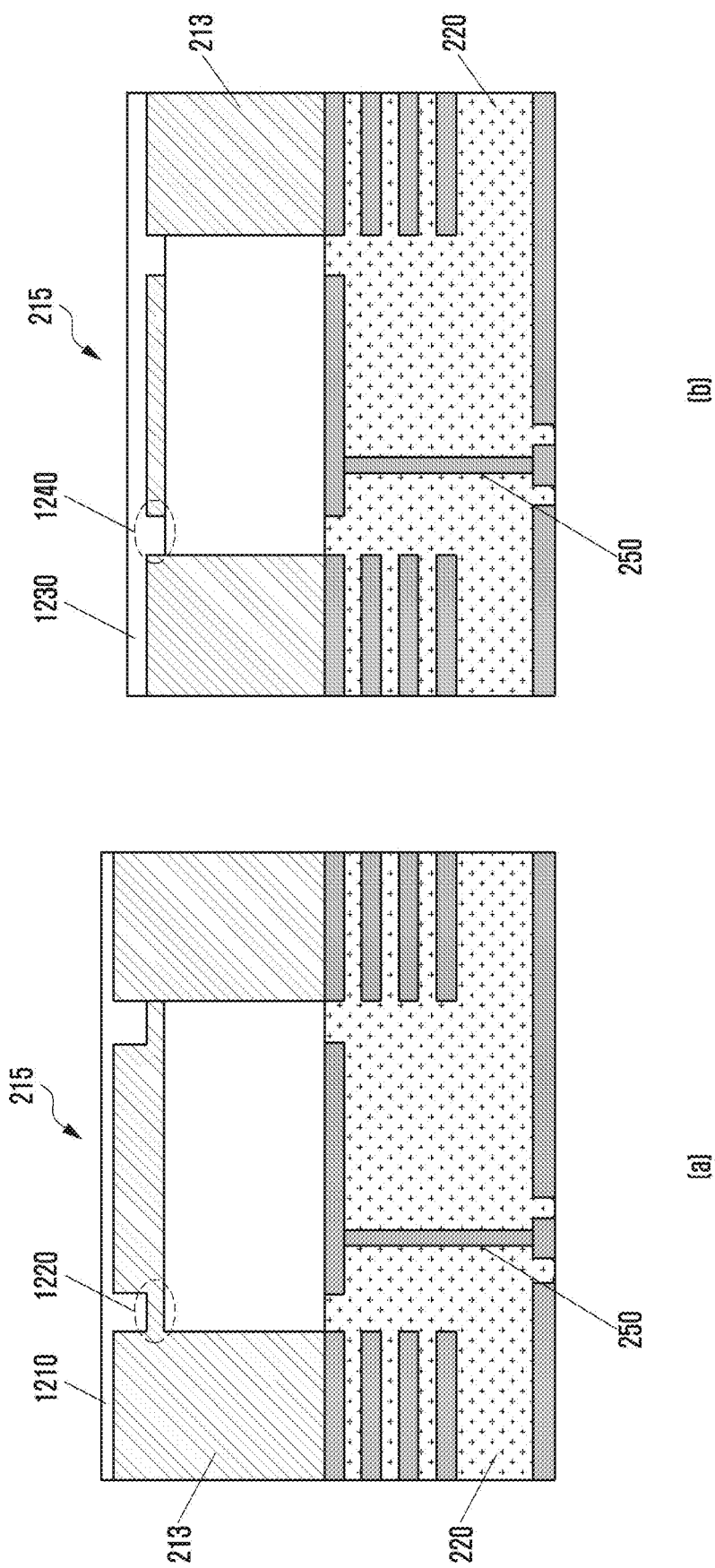
FIG. 12 is a cross-sectional view illustrating an antenna element and an RF module combined with each other according to another embodiment of the present invention.
Figure 13:
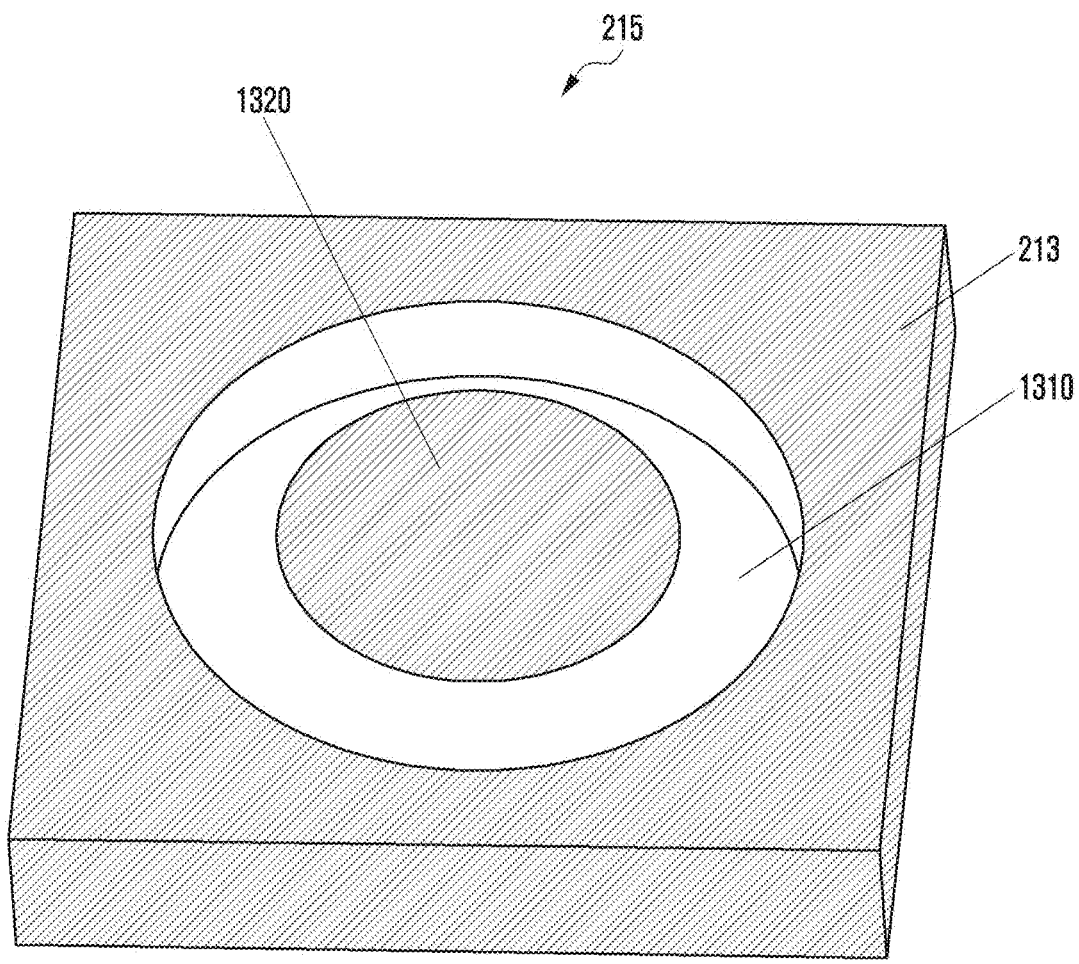
FIG. 13 is a perspective view illustrating a combined state of an antenna element and an RF module according to another embodiment of the present invention.
Figure 14:
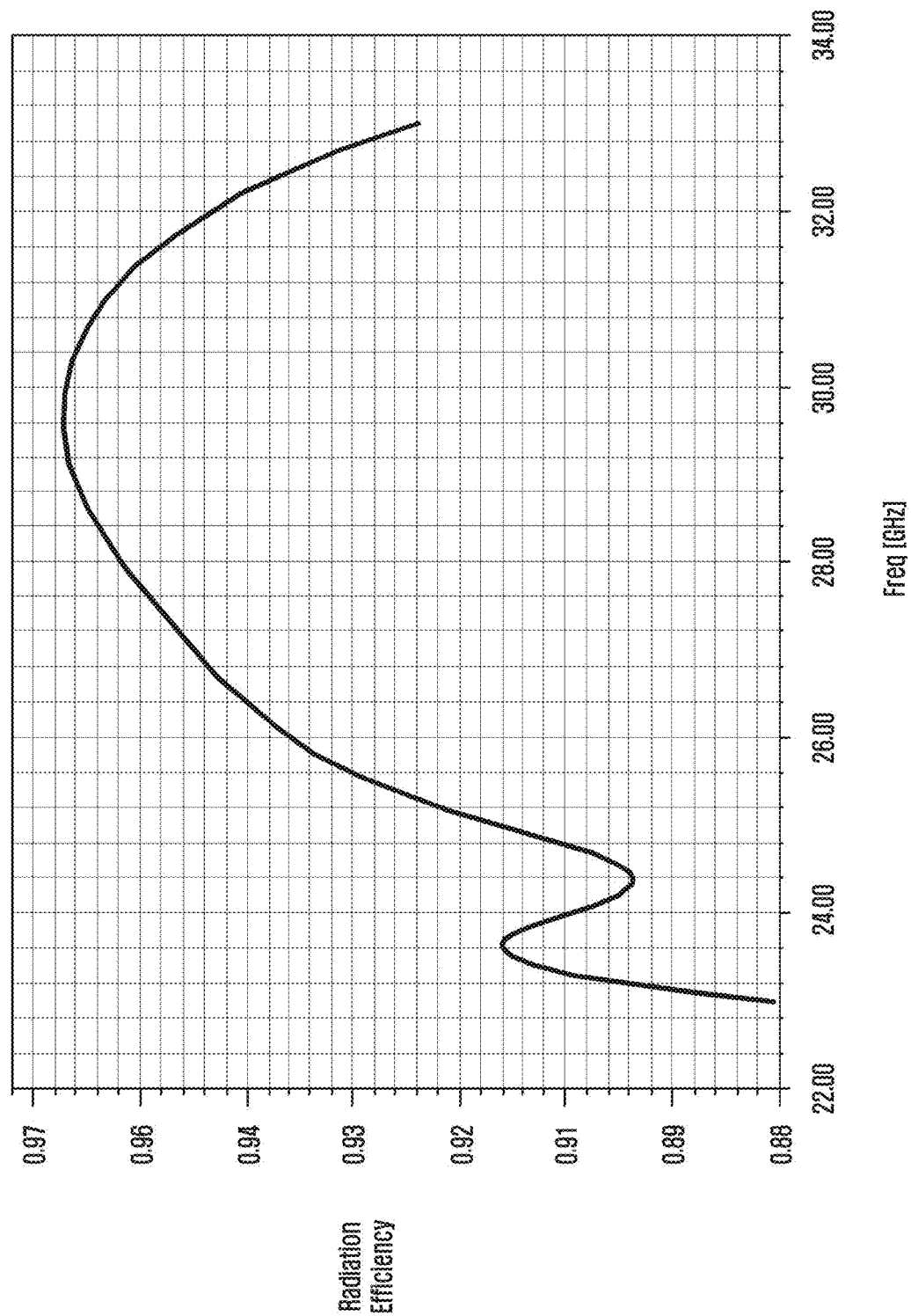
FIG. 14 is a diagram illustrating radiation efficiency, when an antenna element and an RF module are combined with each other, according to another embodiment of the present invention are combined.
Figure 15:
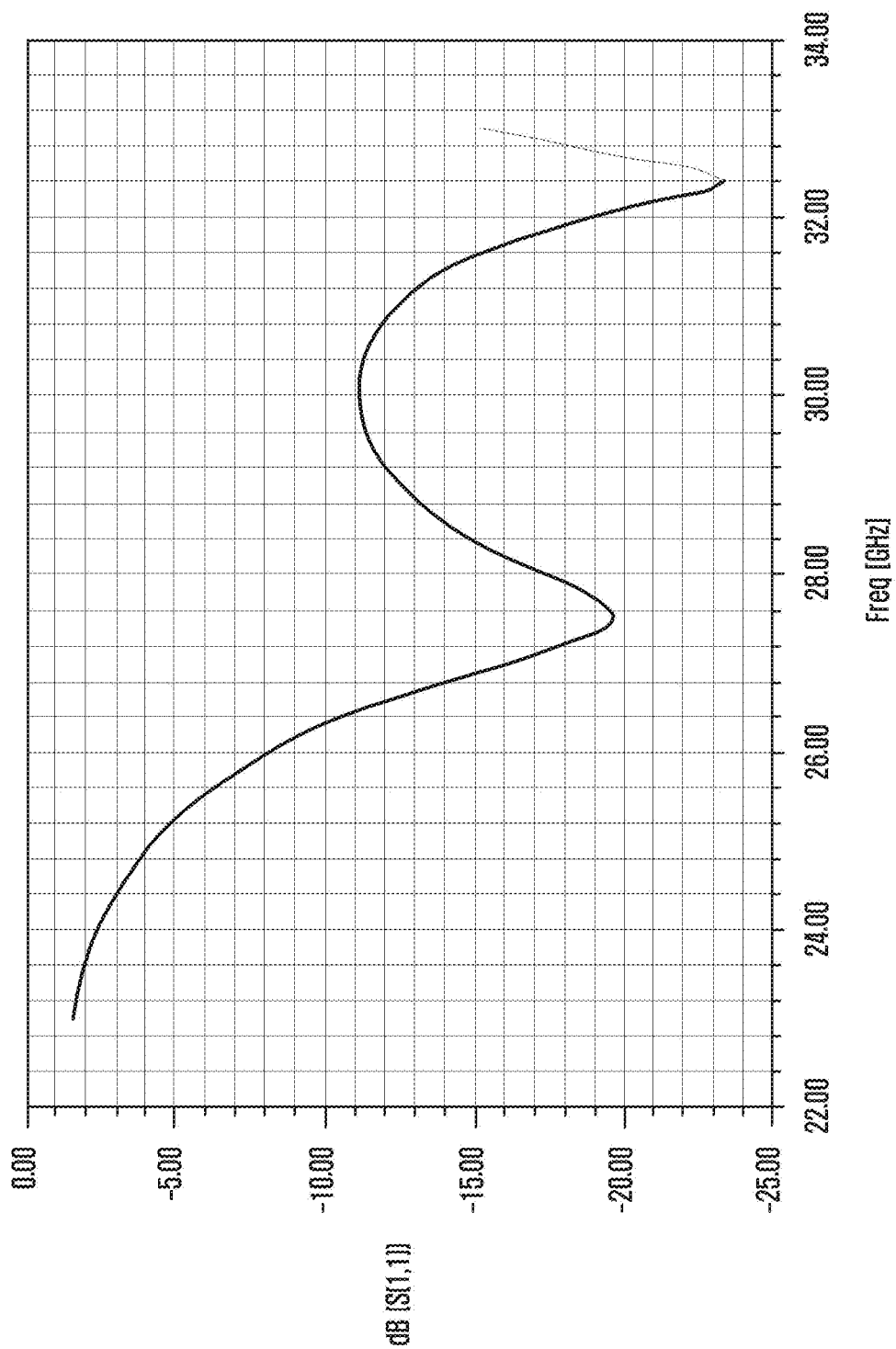
FIG. 15 is an S11 graph showing an antenna frequency band performance, when an antenna element and an RF module are combined with each other, according to another embodiment of the present invention.

FIG. 12 is a cross-sectional view illustrating an antenna element and an RF module combined with each other according to another embodiment of the present invention. FIG. 13 is a perspective view illustrating a combined state of an antenna element and an RF module according to another embodiment of the present invention. FIG. 14 is a diagram illustrating radiation efficiency, when an antenna element and an RF module are combined with each other, according to another embodiment of the present invention are combined. FIG. 15 is an S11 graph showing an antenna frequency band performance, when an antenna element and an RF module are combined with each other, according to another embodiment of the present invention.

Referring to (a) of FIG. 12, the electronic device according to an embodiment of the present invention may include the antenna element 215 formed in the metal case 213. The antenna element 215 may have a slot-shaped thin metal film 1220 that does not penetrate the metal case 213. That is, as indicated by 1220, the antenna element 215 may be formed like a patch including a slot in which a thin metal film is left in the metal case 213.

In addition, the upper surface of the metal case 213 may be oxidized by an anodizing technique. That is, when the anodizing technique is applied, the upper surface of the metal case 213 may be oxidized to form an oxide film 1210.

When the anodizing technique is applied, the thin metal film 1220 remaining without passing through the metal case 213 in a process of forming the antenna element 215 may be oxidized and thus disappear. That is, the thin metal film 1220 formed in a slot shape that does not penetrate the metal case 213 is oxidized and disappears in a process of anodizing the upper surface of the metal case 213. Therefore, when the anodizing process is completed, the antenna element 215 may include a slot-shaped radiation part 211 passing through the metal case 213. As a result, the antenna element 215 including the circular slot 211 passing through the metal case 213 may be integrally formed in the metal case 213.

Anodizing the metal case 213 as described above may serve to protect the product from external influences. In addition, the oxide film 1210 formed on the surface of the metal case 213 may improve the outward appearance of the antenna elements 215 formed passing through the metal case 213.

In addition, instead of including two facing semicircular slots 211 as shown in FIGS. 3, 6 and 9, the antenna element 215 may include an open-structured radiation part as shown in FIG. 13. That is, a single circular slot-shaped radiation part 1310 passing through the metal case 213 may be integrally combined with the metal case 213 and included in the antenna element 215. Specifically, in a process of fabricating the antenna element 215, the antenna element 215 is first formed in a patch shape having a circular slot that does not penetrate the upper surface of the metal case 213. Then, by performing an anodizing treatment for the upper surface of the second metal case 213, the thin metal film 1220 disappears and thus the circular slot remains passing through the metal case 213. As a result, the antenna element 215 including the circular slot radiation part 1310 may be formed. Because a circular metal plate 1320 separated by the circular slot 1310 is attached to the oxide film 1210, the antenna element 215 may be integrally formed with the metal case 213.

Next, referring to (b) of FIG. 12, the electronic device according to an embodiment of the present invention may include the antenna element 215 formed in the metal case 213. The antenna element 215 may be formed through a die casting and injection technique.

Specifically, as shown in (b) of FIG. 12, the antenna element 215 may be formed in the metal case 213 through the die casting technique to include the radiation part formed as a circular slot 1240 passing through the metal case 213. Then, an additive material, e.g., a polycarbonate film 1230 containing polycarbonate, may be coated on the upper surface of the metal case 213. As a result, the circular metal plate 1320 separated by the circular slot 1240 is attached to the polycarbonate film 1230, so that the antenna element 215 may be integrally formed with the metal case 213. Accordingly, as shown in (a) of FIG. 12 and FIG. 13, the antenna element 215 may include the radiation part 1240 or 1310 having an open structure.

In the antenna apparatus including the antenna element 215 having the open-structured radiation part 1240 or 1310, the efficiency may be 90% and the gain may be 8.2 dBi as shown in FIG. 14. Also, as shown in FIG. 15, a frequency of −10 dB or less may have a wideband characteristic in a band of about 22 GHz or more.

Figure 16:
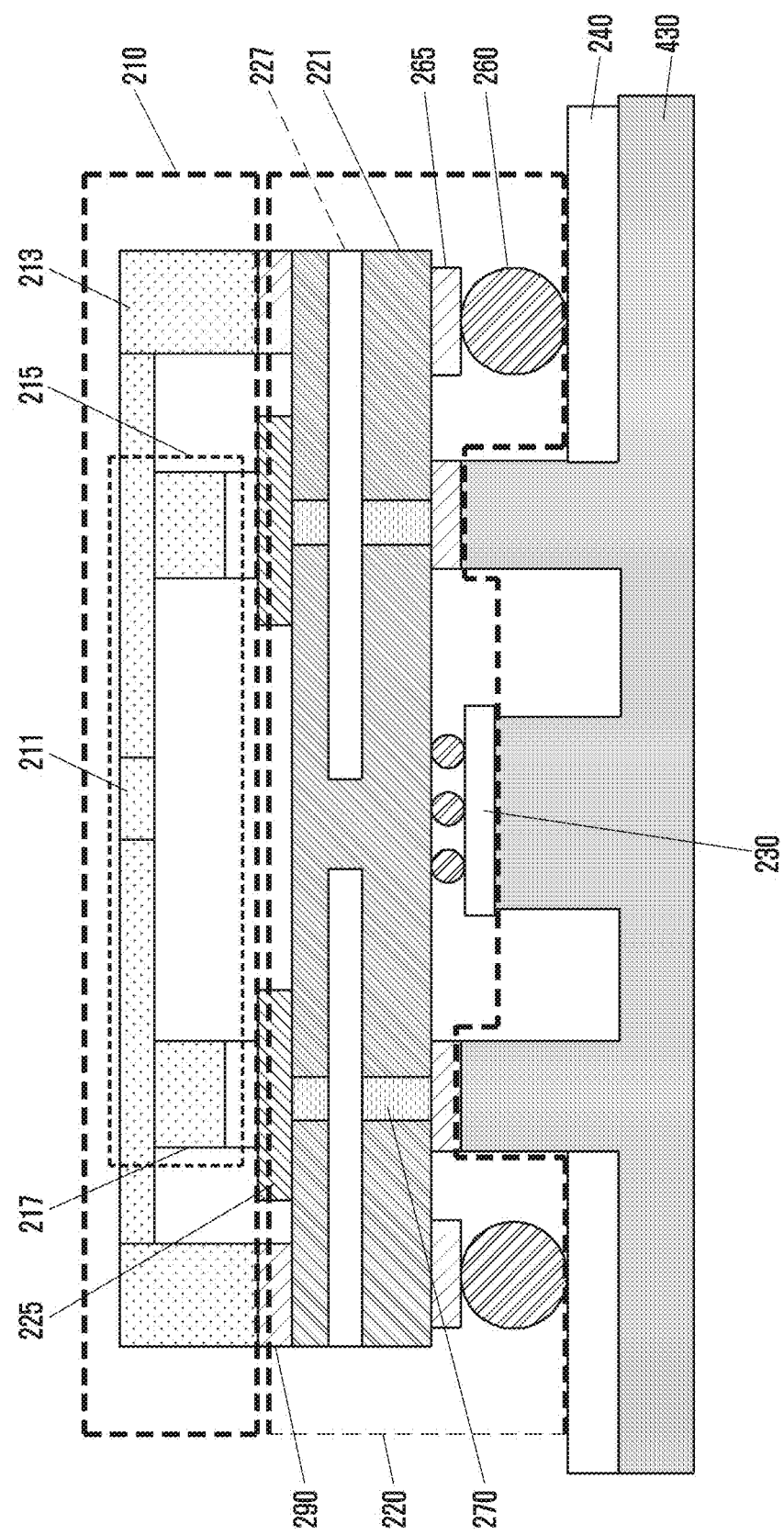
FIG. 16 is a cross-sectional view illustrating an antenna apparatus and an electronic device including the antenna apparatus according to another embodiment of the present invention.
Figure 17:
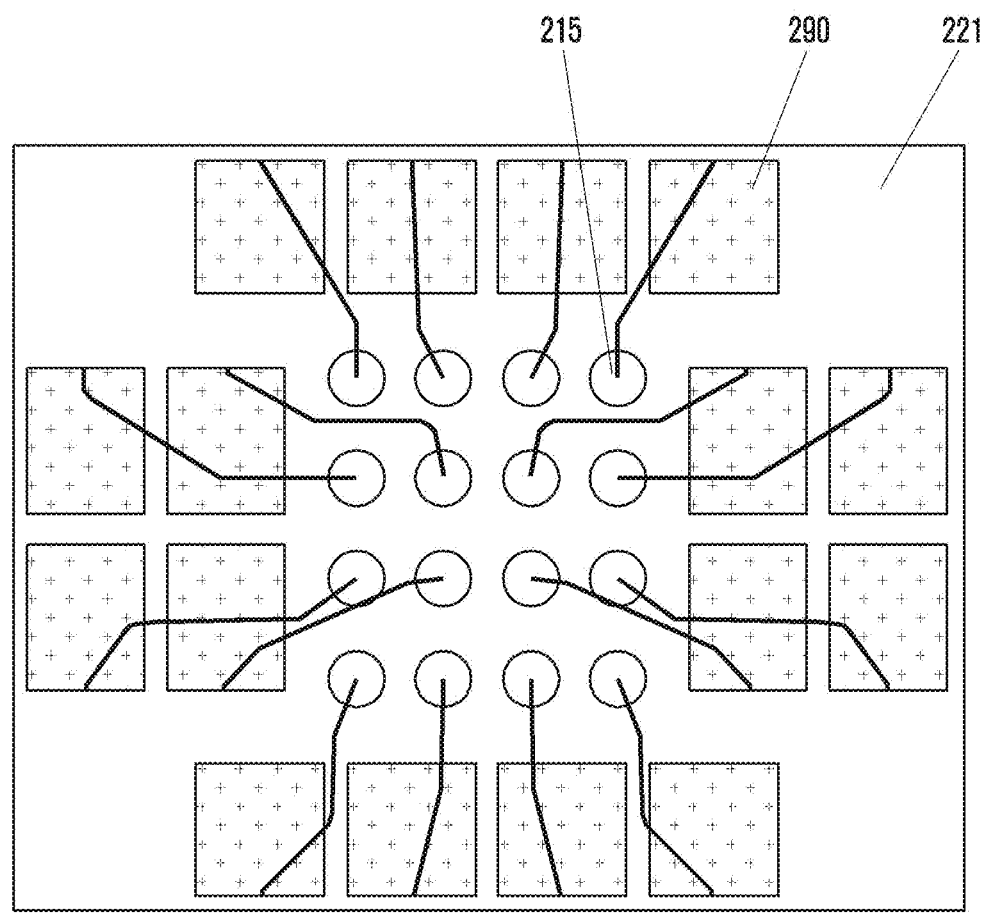
FIG. 17 is a diagram illustrating an example of a combined relation between an array antenna and a power amplifier according to an embodiment of the present invention.
Figure 18:
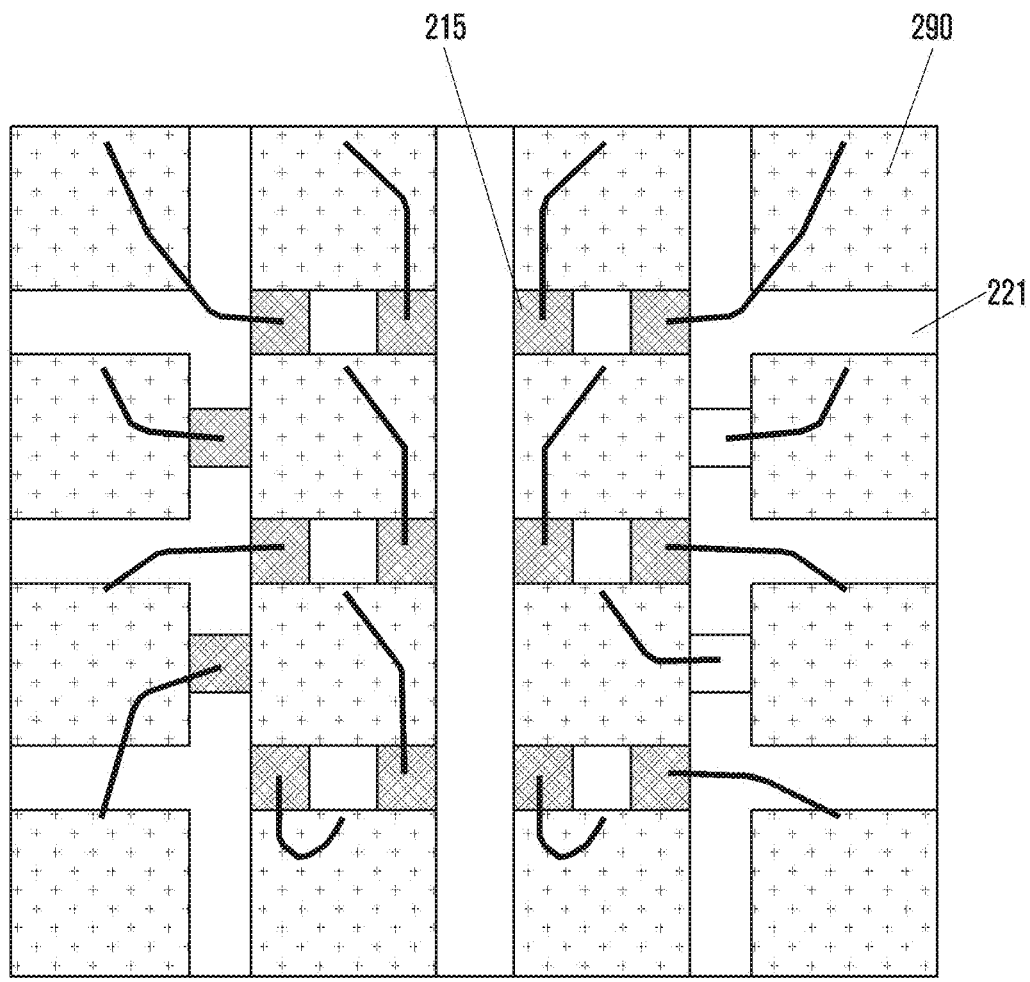
FIG. 18 is a diagram illustrating another example of a combined relation between an array antenna and a power amplifier according to an embodiment of the present invention.

FIG. 16 is a cross-sectional view illustrating an antenna apparatus and an electronic device including the antenna apparatus according to another embodiment of the present invention. FIG. 17 is a diagram illustrating an example of a combined relation between an array antenna and a power amplifier according to an embodiment of the present invention. FIG. 18 is a diagram illustrating another example of a combined relation between an array antenna and a power amplifier according to an embodiment of the present invention.

Referring to FIG. 16, the electronic device according to an embodiment of the present invention may include the array antenna 210, the RF module 220, and the main substrate 240. In this case, the electronic device may be a base station (Node B, evolved Node B (eNB), etc.). Hereinafter, the same elements as those shown in FIG. 2 among elements shown in FIG. 16 will not be described in detail.

The array antenna 210 may be formed in the metal case 213 of the electronic device and may include at least two antenna elements 215. The at least two antenna elements 215 may operate in the same frequency band. In addition, the antenna element 215 may include the radiation part 211 for radiating an antenna signal to the outside of the electronic device. Since the array antenna 210 has been described with reference to FIGS. 2 to 15, a detailed description thereof will be omitted.

The metal case 213 may include at least one metal case connection member 217 for combining the metal case 213 and the RF module 220. The metal case connection member 217 may be made of a thermally conductive material capable of conducting heat.

The RF module 220 may be connected to the array antenna 210 through the upper layer 225. Inside the RF module 220, the heat dissipation vias 270 may be formed vertically between the upper and lower surfaces of the RF module substrate 221. Although the feed line 250 is not shown in FIG. 16, this will be described later with reference to FIGS. 17 and 18.

The RFIC 230 may be disposed under the RF module substrate 221 and connected to the heat dissipation part 430. The RF module 220 may be connected to the main substrate 240 through the main substrate connection member 260, and the heat dissipation part 430 may be located under the main substrate 240.

Although the RFIC 230 is shown as directly connected to the heat dissipation part 430, this is exemplary only. Alternatively, as shown in FIGS. 2 and 3, the main substrate 240 may be located under the RF module 220 and above the RFIC 230. In addition, the heat dissipation part 430 may be disposed under the main substrate 240, and the RFIC 230 may not be directly connected to the heat dissipation part 430.

Meanwhile, as shown in FIG. 16, the power amplifier (PA) 290 may be located on the upper surface of the RF module substrate 221 of the RF module 220. Also, the front end module (FEM) including the power amplifier 290 may be located on the upper surface of the RF module substrate 221. However, for clarity, it is shown that the power amplifier 290 is located on the upper surface of the RF module substrate 221.

In this case, the power amplifier 290 may be connected to the antenna elements 215 of the array antenna 210 through the feed line. Also, the power amplifier 290 may be connected to the RFIC 230.

For this, as shown in FIG. 17, the power amplifiers 290 and the array antenna 210 may be coplanar. That is, the power amplifiers 290 surrounding the array antenna 210 may be disposed on the same plane as the array antenna 210. Also, each antenna element 215 may be connected to the corresponding power amplifier 290 through the feed line.

Alternatively, as shown in FIGS. 18 and 16, the power amplifiers 290 may be located on the upper surface of the RF module substrate 221, and the array antenna 210 may be located on the power amplifiers 290. That is, the power amplifiers 290 and the array antenna 210 may have a stacked structure. In this case, as shown in FIG. 18, each of the power amplifiers 290 may be disposed at a location closest to the corresponding antenna element 215. This disposition may minimize the length of the feed line between the power amplifier 290 and the antenna element 215 and also reduce the size of the antenna apparatus.

Figure 19:
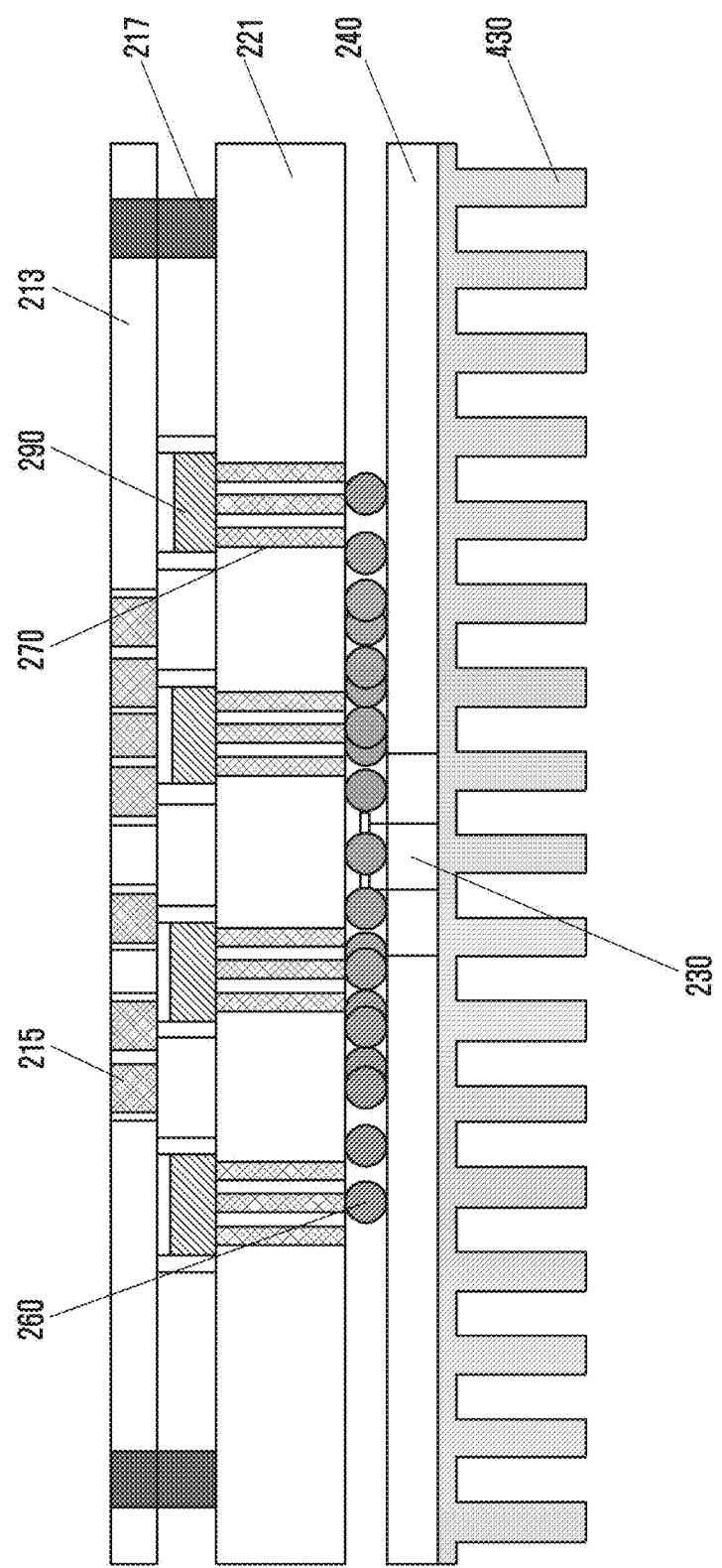
FIG. 19 is a cross-sectional view illustrating an antenna apparatus and an electronic device including the antenna apparatus according to still another embodiment of the present invention.
Figure 20:
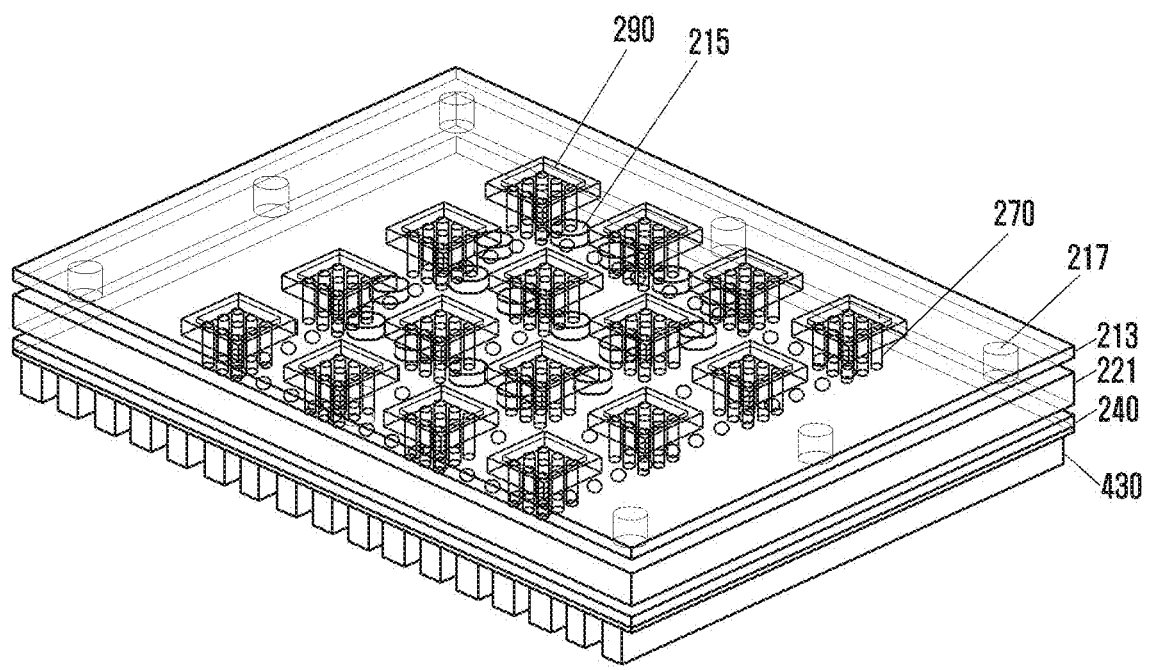
FIG. 20 is a perspective view illustrating an antenna apparatus and an electronic device including the antenna apparatus according to still another embodiment of the present invention.
Figure 21:
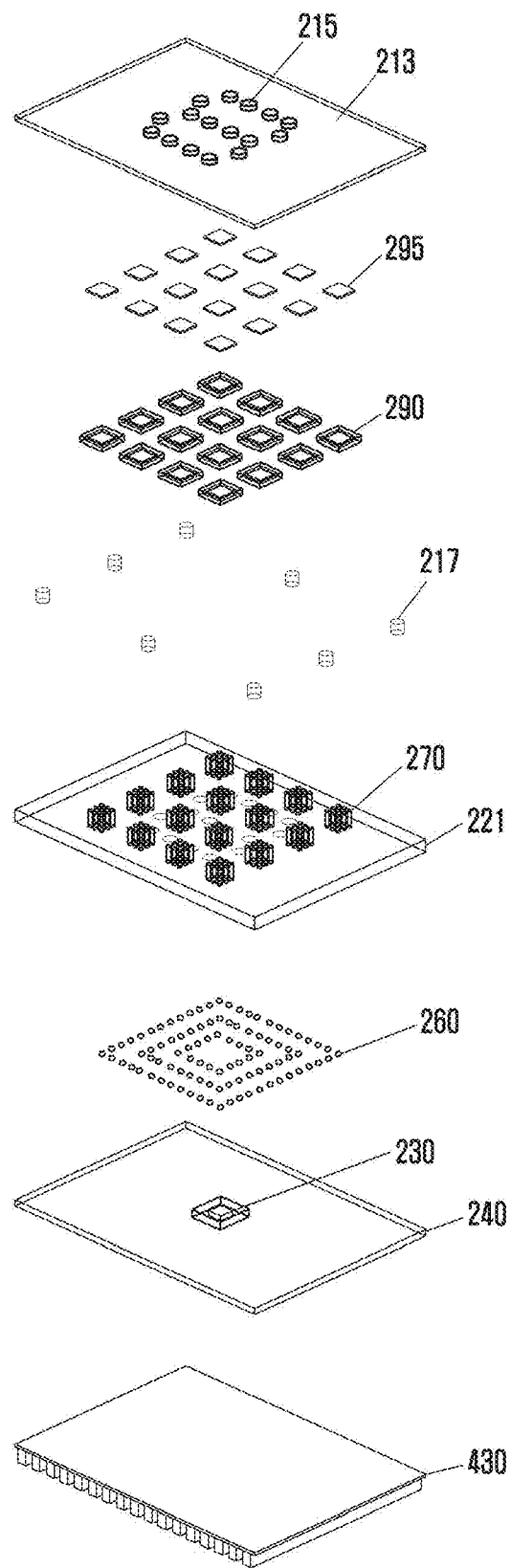
FIG. 21 is an exploded view illustrating an antenna apparatus and an electronic device including the antenna apparatus according to still another embodiment of the present invention.
Figure 22:
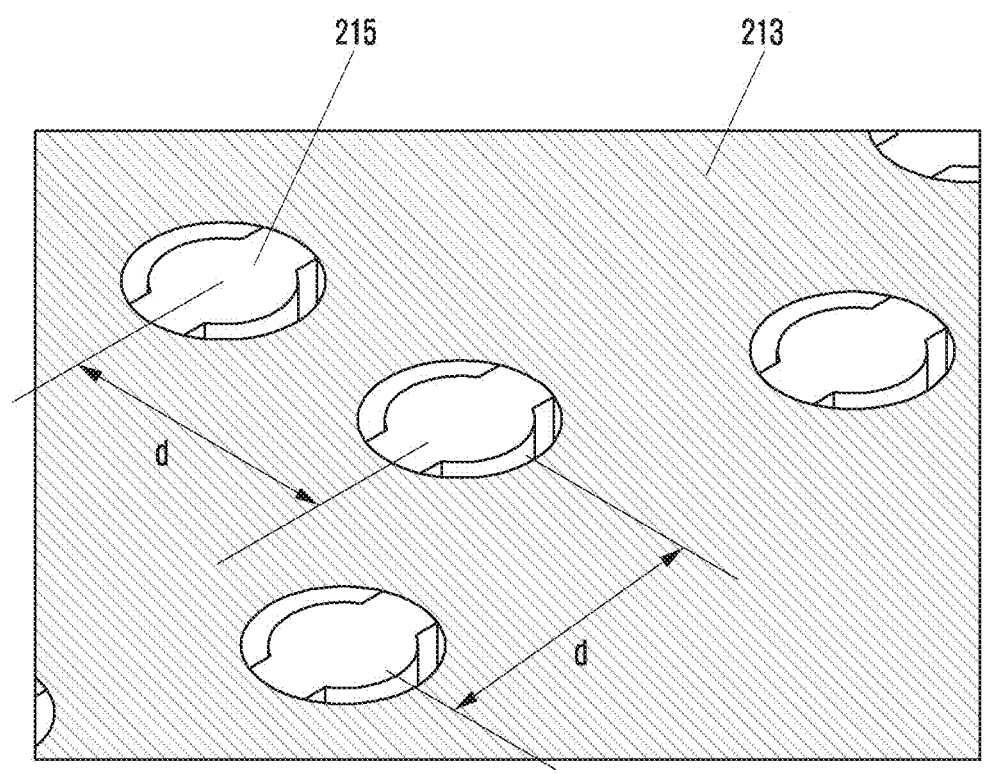
FIG. 22 is an enlarged view illustrating an antenna element according to an embodiment of the present invention.

FIG. 19 is a cross-sectional view illustrating an antenna apparatus and an electronic device including the antenna apparatus according to still another embodiment of the present invention. FIG. 20 is a perspective view illustrating an antenna apparatus and an electronic device including the antenna apparatus according to still another embodiment of the present invention. FIG. 21 is an exploded view illustrating an antenna apparatus and an electronic device including the antenna apparatus according to still another embodiment of the present invention. FIG. 22 is an enlarged view illustrating an antenna element according to an embodiment of the present invention.

Referring to FIGS. 19 to 22, the main substrate 240 may be positioned on the heat dissipation part 430. In addition, the RFIC 230 may be mounted on the central region of the main substrate 240. In order for the RFIC 230 to be disposed on the same plane as the main substrate 240, a space for the RFIC may be formed in the central region of the main substrate 240. The main substrate 240 may be connected to the RF module substrate 221 through the connection member 260.

A plurality of the power amplifiers 290 may be disposed on the RF module substrate 221. In addition, the heat dissipation vias 270 may be formed in the RF module substrate 221 to dissipate heat generated at the power amplifier 290 to the heat dissipation part 280. In this case, the heat dissipation vias 270 may be formed in the height direction of the RF module substrate 221 at positions corresponding to the power amplifiers 290.

A connection member 295 such as a conductive tape may be disposed on each of the power amplifiers 290 so as to connect the power amplifiers 290 to the metal case 213.

The antenna elements 215 corresponding to the respective power amplifiers 290 may be integrally formed in the metal case 213 so that each antenna element 215 is formed at a position closest to the corresponding power amplifier 290.

Referring to FIG. 22, a distance (d) between adjacent antenna elements 215 may be about 0.5 to 1λ. The antenna elements 215 may be integrated with the metal case 213 in the form of a shorting pin.

Because the antenna elements 215 are integrally formed in the metal case 213, heat generated at the antenna elements 215 may be dissipated directly to the outside of the electronic device through the metal case 213. Also, the transmission and reception of signals at the antenna elements 215 are performed directly through the metal case 213. Therefore, the radiation efficiency may be increased. In addition, the insertion loss may be improved by about 2 dB through an interleaved arrangement with external components.

Figure 23:
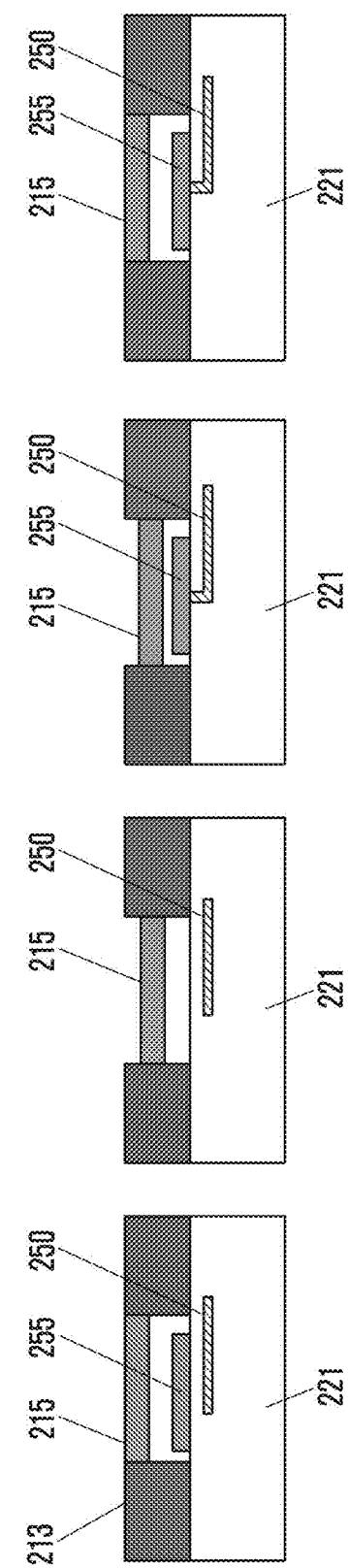
FIG. 23 is a diagram illustrating examples of feed line connection method according to an embodiment of the present invention.

FIG. 23 is a diagram illustrating examples of feed line connection method according to an embodiment of the present invention.

In FIG. 23, the first and second instances are examples of aperture feeding. In case of the first instance of FIG. 23, the feed line 250 may be disposed inside the RF module substrate 221 and may not be directly connected to an upper feed line 255 located on the upper surface of the RF module substrate 221. In this case, a signal supplied to the feed line 250 may be delivered to the upper feed line 255 through coupling between the feed line 250 and the upper feed line 255. Then, the signal supplied to the upper feed line 255 may be delivered to the antenna element 215 through another coupling between the upper feed line 255 and the antenna element 215.

In case of the second instance of FIG. 23, the feed line 250 may be disposed inside the RF module substrate 221 and supply a signal to the antenna element 215 through coupling. In this case, if the upper layer 225 is interposed between the RF module substrate 221 and the metal case 213 even though the upper layer 225 is not shown in this drawing, the upper layer 225 may have the upper opening 226 at a location corresponding to the antenna element 215 as shown in FIG. 2.

Next, the third and fourth instances of FIG. 23 are examples of direct feeding. In the third and fourth instances, the feed line 250 disposed inside the RF module substrate 221 may be directly connected to the upper feed line 255 located on the upper surface of the RF module substrate 221. Therefore, a signal supplied to the feed line 250 may be directly delivered to the upper feed line 255. Then, the signal supplied to the upper feed line 255 may be delivered to the antenna element 215 through coupling between the upper feed line 255 and the antenna element 215. In this case, a distance between the upper feed line 255 and the antenna element 215 may be varied depending on embodiments. For example, as shown in the third and fourth instances of FIG. 23, the distance between the upper feed line 255 and the antenna element 215 may vary depending on the strength of the supplied signal, the operating frequency, and the like.

Figure 24:
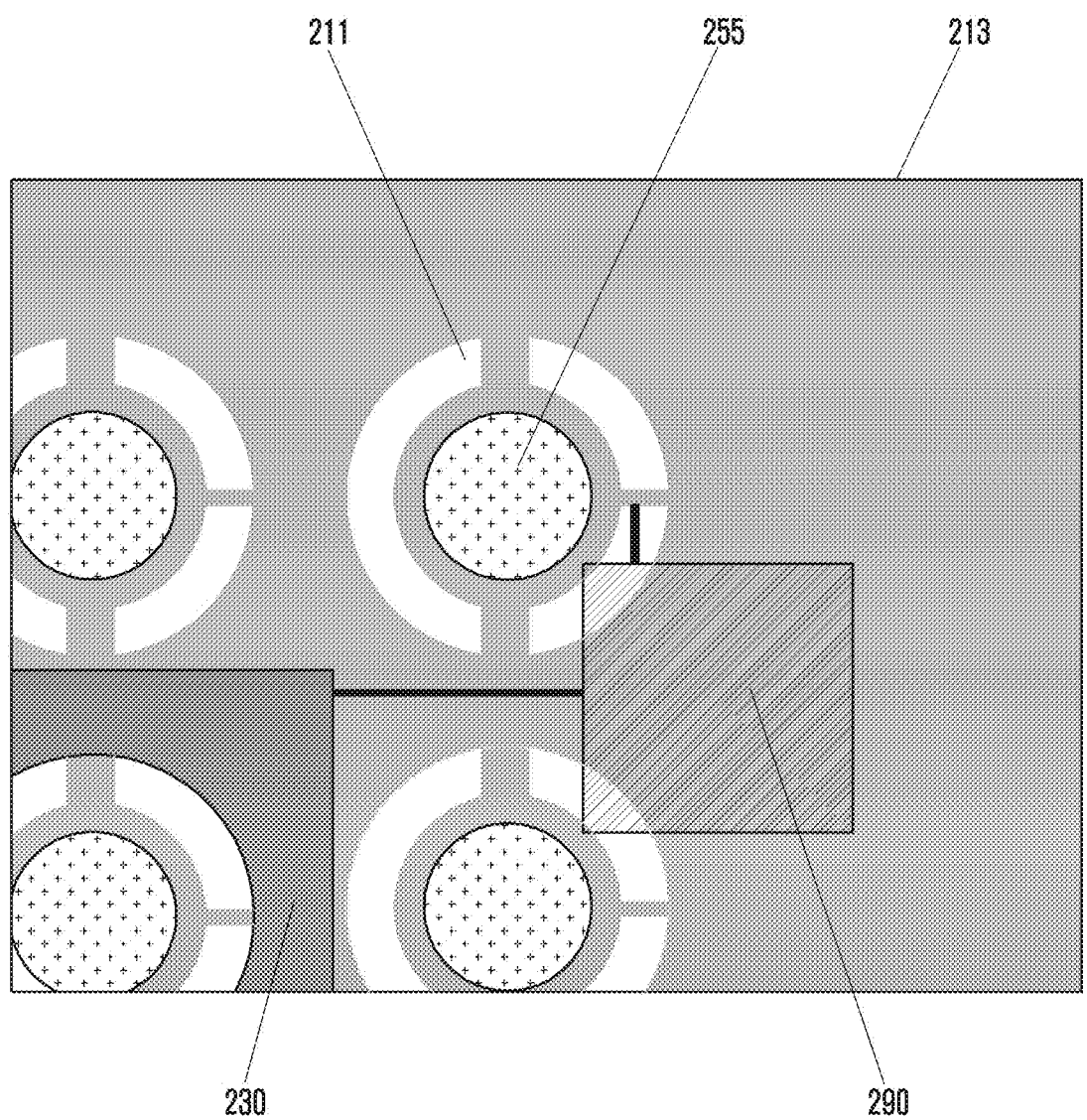
FIG. 24 is a diagram illustrating a connected relation among an antenna element, a power amplifier, and an RFIC according to an embodiment of the present invention.
Figure 25:
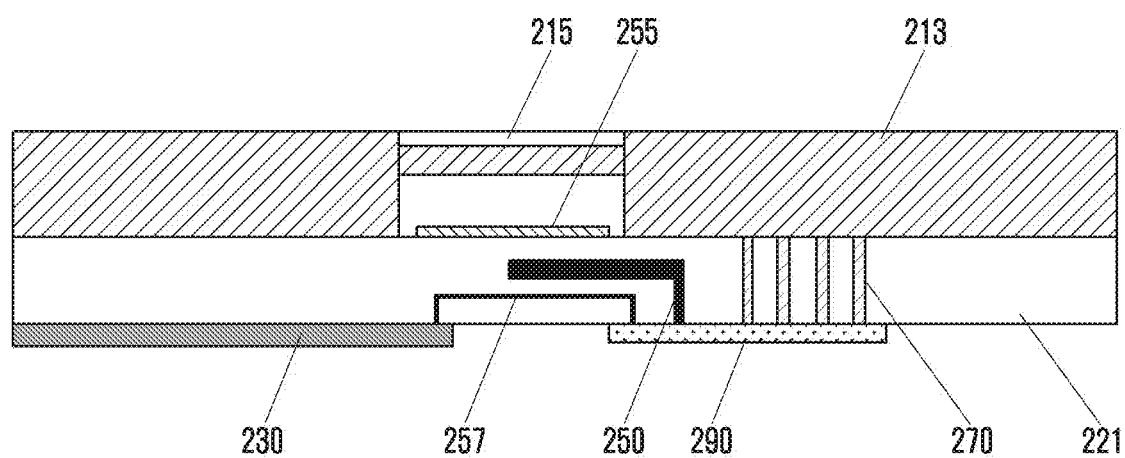
FIGS. 25 and 26 are diagrams illustrating a location of a power amplifier disposed in an electronic device according to an embodiment of the present invention.
Figure 26:
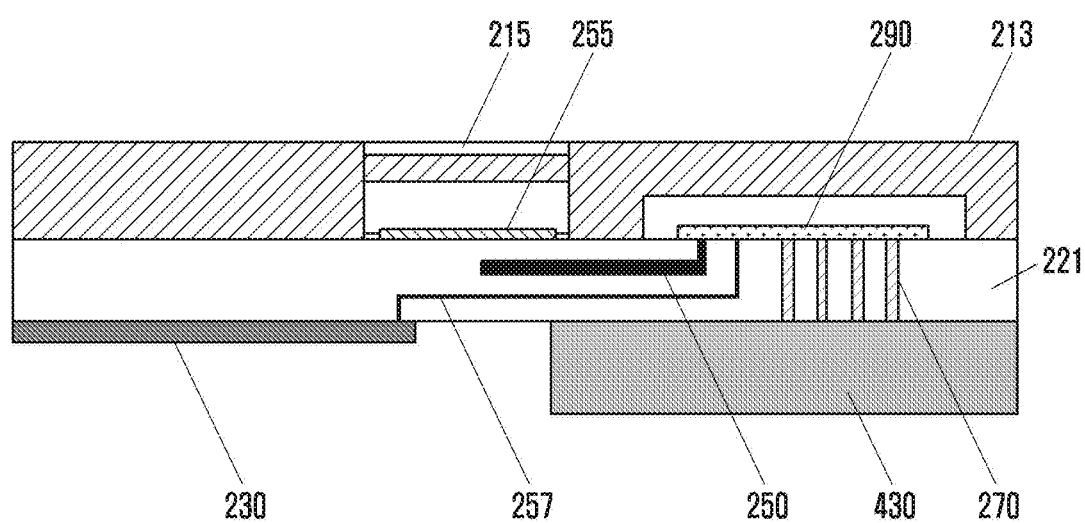

FIG. 24 is a diagram illustrating a connected relation among an antenna element, a power amplifier, and an RFIC according to an embodiment of the present invention. FIGS. 25 and 26 are diagrams illustrating a location of a power amplifier disposed in an electronic device according to an embodiment of the present invention.

Referring to FIGS. 24 and 25, the antenna element 215 may be integrally formed with the metal case 213. The RF module substrate 221 may be disposed under the metal case 213, and the RFIC 230 may be disposed under the RF module substrate 221.

In addition, the power amplifier 290 may be disposed under the RF module substrate 221 on the same plane as the RFIC 230. The RFIC 230 and the power amplifier 290 may be connected to each other through a second feed line 257, and a signal generated at the RFIC 230 may be amplified by the power amplifier 290. Also, the power amplifier 290 and the upper feed line 255 may be coupling-connected to each other through a first feed line 250 according to aperture feeding. In a certain embodiment, the power amplifier 290 and the upper feed line 255 may be directly connected through the first feed line 250.

In addition, the heat dissipation vias 270 may be formed inside the RF module substrate 221 so as to connect the power amplifier 290 and the metal case 213. Heat generated at the power amplifier 290 may be delivered to the metal case 213 through the heat dissipation vias 270 and then dissipated to the outside of the metal case 213. Further, although not shown, the heat dissipation part 430 may be positioned below the power amplifier 290 so as to dissipate heat generated at the power amplifier 290 to the outside of the electronic device.

Next, referring to FIGS. 24 and 26, the power amplifier 290 may be located above the RF module substrate 221, unlike FIG. 25. In order for the power amplifier 290 to be accommodated, the metal case 213 may have a space for the power amplifier 290.

In this case, the RFIC 230 and the power amplifier 290 may be connected to each other through the second feed line 257, and a signal generated at the RFIC 230 may be amplified by the power amplifier 290. Also, the power amplifier 290 and the upper feed line 255 may be coupling-connected to each other through the first feed line 250 according to aperture feeding. In a certain embodiment, the power amplifier 290 and the upper feed line 255 may be directly connected through the first feed line 250.

In addition, the heat dissipation vias 270 may be formed inside the RF module substrate 221 so as to connect the power amplifier 290 and the heat dissipation part 430 located under the RF module substrate 221. Heat generated at the power amplifier 290 may be delivered to the heat dissipation part 430 through the heat dissipation vias 270 and then dissipated to the outside of the electronic device. Further, the heat generated at the power amplifier 290 may be delivered to the metal case 213 located above the power amplifier 290 in the form of a thermal radiation or convection. Then, the heat delivered to the metal case 213 may be dissipated to the outside of the metal case 213.

Embodiments disclosed in the present specification and drawings are only illustrative of specific examples in order to facilitate description and understanding of the technical contents, and are not intended to limit the scope of the present invention. It is to be understood by those skilled in the art that other modifications based on the technical idea of the present invention are possible in addition to the embodiments disclosed herein.

While this disclosure contains many specific implementation details, these should not be construed as limitations on the scope of the invention or of what may be claimed, but rather as descriptions of features that may be specific to particular embodiments of particular invention.

The invention claimed is:

1. An electronic device comprising:
   a metal case; and
   an array antenna formed integrally on one surface of the metal case,
   wherein the array antenna comprises at least two antenna elements,
   wherein a radiation part included in each antenna element is vertically aligned with a radio frequency (RF) module to emit heat generated from the RF module to the radiation part,
   wherein each antenna element is formed slot-shaped through the metal case by an anodizing process and each antenna element is integrally formed in the metal case by the slot-shape, and
   wherein the at least two antenna elements are configured to transmit in a same frequency band.

2. The electronic device of claim 1, wherein an oxide film or a polycarbonate film is formed on an upper surface of the metal case.

3. The electronic device of claim 1, further comprising:
   the RF module disposed under the metal case; and
   a metal case connection configured to:
   connect the RF module and the metal case, and
   dissipate heat of each antenna element.

4. The electronic device of claim 3, further comprising:
   at least one power amplifier formed around the array antenna on an upper surface of the RF module, or
   at least one power amplifier disposed between the upper surface of the RF module and a lower surface of the array antenna.

5. The electronic device of claim 3,
   wherein the RF module further includes a feed line located therein, and
   wherein the feed line is either:
   connected to the array antenna by aperture feeding and is configured to supply a signal to the at least two antenna elements through coupling, or
   connected to an upper feed line located on an upper surface of the RF module and is configured to supply a signal to each antenna element through the upper feed line.

6. The electronic device of claim 3, wherein the RF module includes at least one heat dissipation via formed therein.

* * * * *